(12) United States Patent
Heshmat Dehkordi

(10) Patent No.: US 11,196,976 B2
(45) Date of Patent: Dec. 7, 2021

(54) SYSTEMS AND METHODS FOR VIRTUAL LIGHT FIELD EXPANSION WITH ELECTRO-OPTICAL TESSELLATION

(71) Applicant: Brelyon Inc., Redwood City, CA (US)

(72) Inventor: Barmak Heshmat Dehkordi, San Mateo, CA (US)

(73) Assignee: Brelyon Inc., Redwood City, CA (US)

( * ) Notice: Subject to any disclaimer, the term of this patent is extended or adjusted under 35 U.S.C. 154(b) by 0 days.

(21) Appl. No.: 16/812,182

(22) Filed: Mar. 6, 2020

(65) Prior Publication Data

US 2021/0006763 A1 Jan. 7, 2021

Related U.S. Application Data

(60) Provisional application No. 62/869,422, filed on Jul. 1, 2019.

(51) Int. Cl.
| | | |
|---|---|---|
| *H04N 13/139* | (2018.01) | |
| *G02B 30/22* | (2020.01) | |
| *G02B 27/00* | (2006.01) | |
| *H04N 13/344* | (2018.01) | |
| *H04N 13/128* | (2018.01) | |

(52) U.S. Cl.
CPC ....... *H04N 13/139* (2018.05); *G02B 27/0081* (2013.01); *G02B 30/22* (2020.01); *H04N 13/128* (2018.05); *H04N 13/344* (2018.05)

(58) Field of Classification Search
CPC .... G02B 2027/0123; G02B 2027/0134; G02B 27/0081; G02B 27/0172; G02B 30/22; G02B 30/35; G02B 30/36; H04N 13/139; H04N 13/229; H04N 13/232; H04N 13/307; H04N 13/344
See application file for complete search history.

(56) References Cited

U.S. PATENT DOCUMENTS

| | | | | |
|---|---|---|---|---|
| 10,282,912 | B1 * | 5/2019 | Yuan | G09G 3/02 |
| 10,473,935 | B1 * | 11/2019 | Gribetz | G06F 3/011 |
| 10,482,676 | B2 * | 11/2019 | Yuan | G06T 19/006 |
| 10,585,284 | B1 * | 3/2020 | Heshmat | G06T 11/60 |
| 10,663,724 | B1 * | 5/2020 | Laduke | G03B 37/04 |
| 2018/0052346 | A1 * | 2/2018 | Sakai | G02F 1/1393 |
| 2019/0238968 | A1 * | 8/2019 | Hajati | H04R 1/1008 |
| 2019/0285897 | A1 * | 9/2019 | Topliss | G06T 19/006 |
| 2019/0297421 | A1 * | 9/2019 | Beltran | H04S 3/004 |
| 2020/0026084 | A1 * | 1/2020 | Kwon | G02B 27/0093 |

* cited by examiner

*Primary Examiner* — Francis Geroleo
(74) *Attorney, Agent, or Firm* — Sheppard Mullin Richter & Hampton LLP

(57) ABSTRACT

Some implementations of the disclosure are directed to tessellating a light field into a size or depth that is larger or further extended than the pupil size of an imaging system or display system. In some implementations, a display system comprises: a display configured to emit light corresponding to an image; a first optical component positioned in front of the display, the first optical component configured to pass the light to an orthogonal field evolving cavity (OFEC) at a plurality of different angles; the OFEC, wherein the OFEC comprises a plurality of reflectors that are configured to reflect the light passed at the plurality of different angles to tessellate the size of the image to form a tessellated image; and a second optical component optically coupled to the OFEC, the second optical component configured to relay the tessellated image through an exit pupil of the display system.

21 Claims, 27 Drawing Sheets

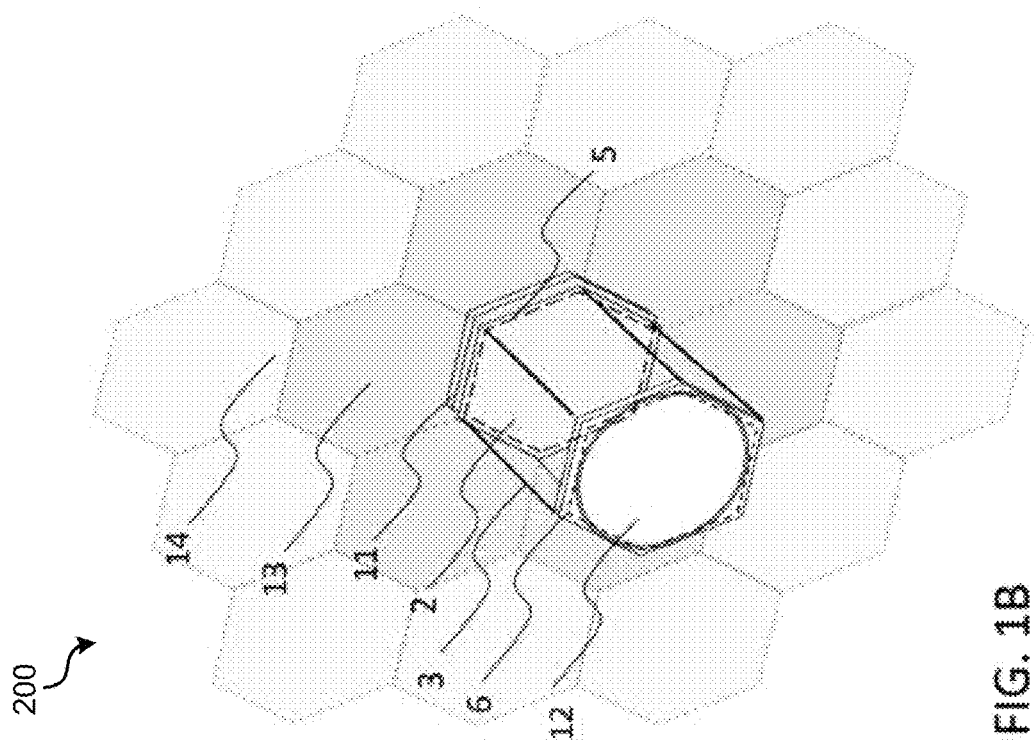
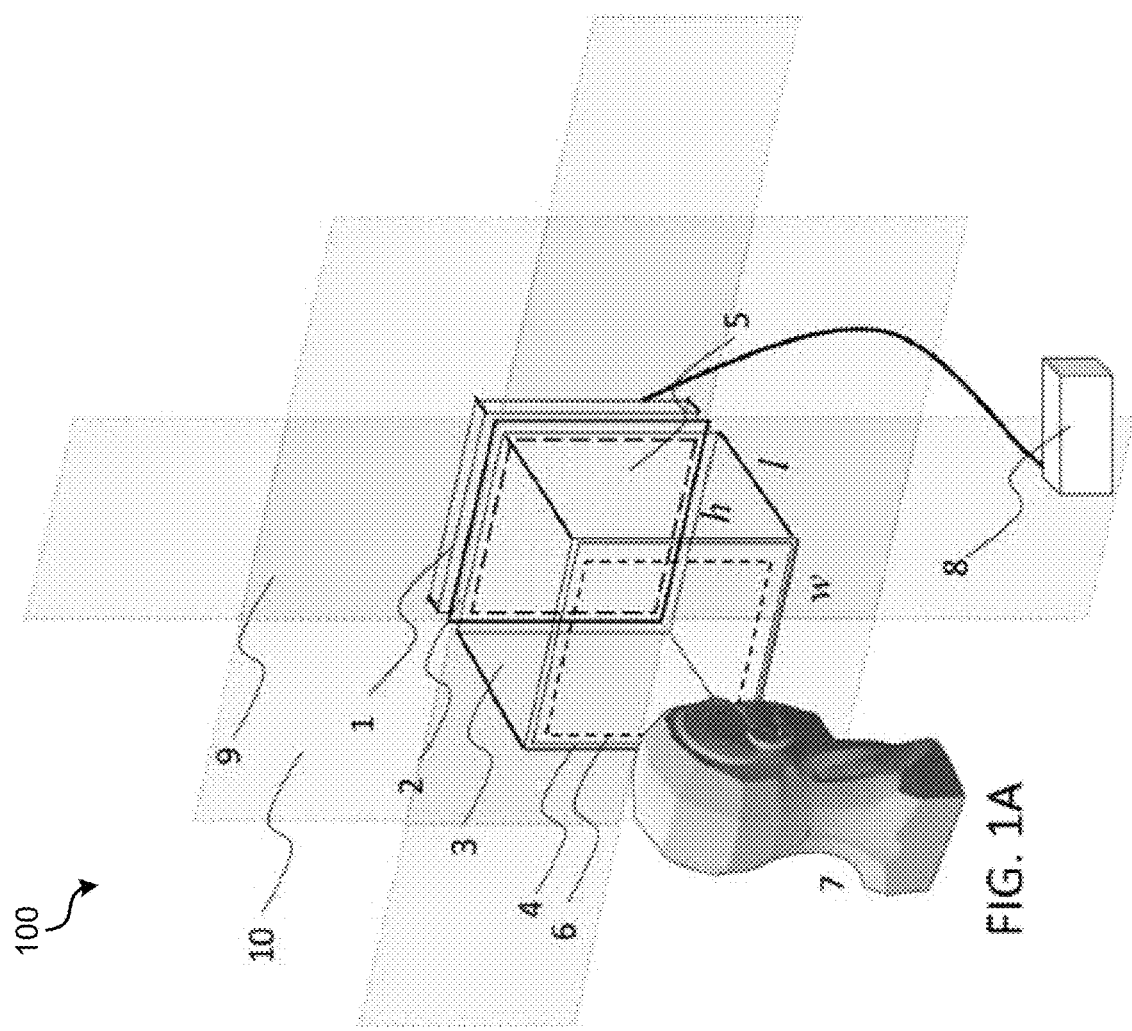
FIG. 1A
FIG. 1B

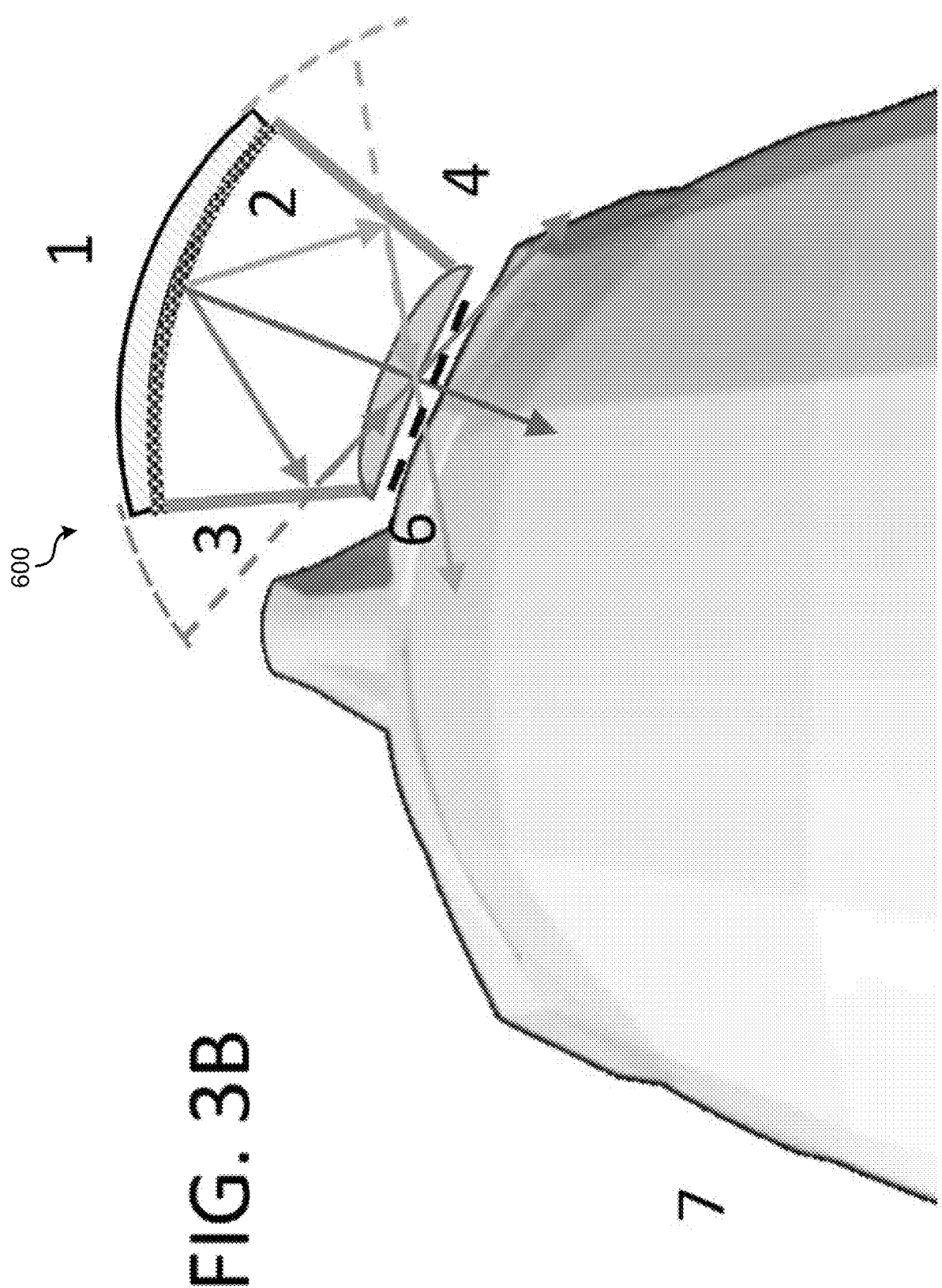

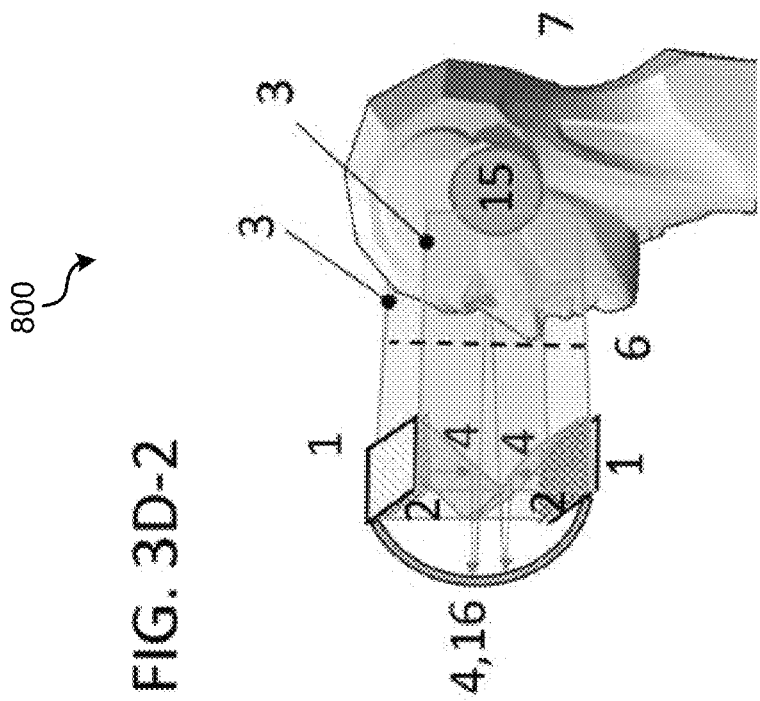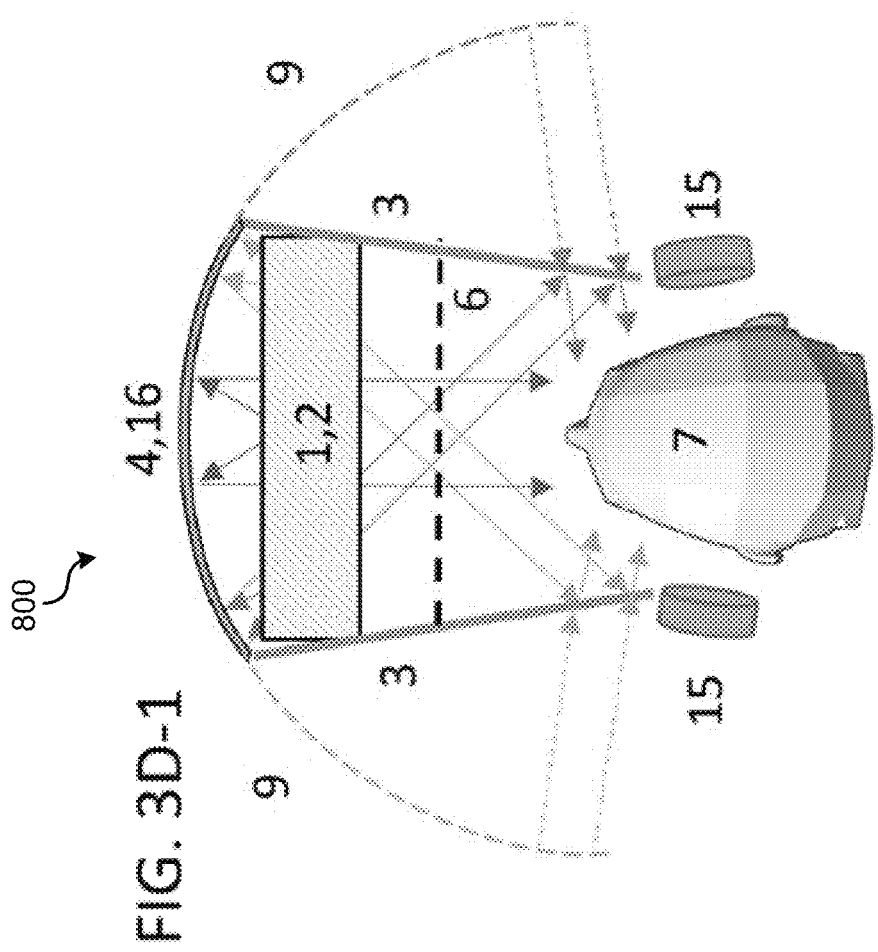
FIG. 3D-2
FIG. 3D-1

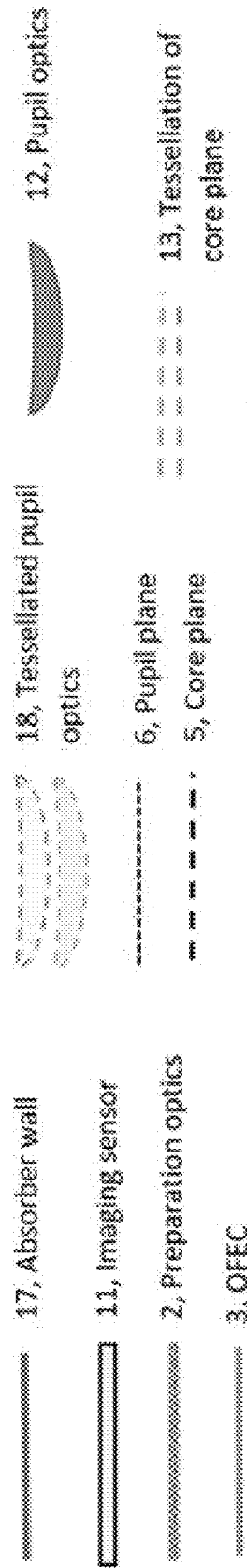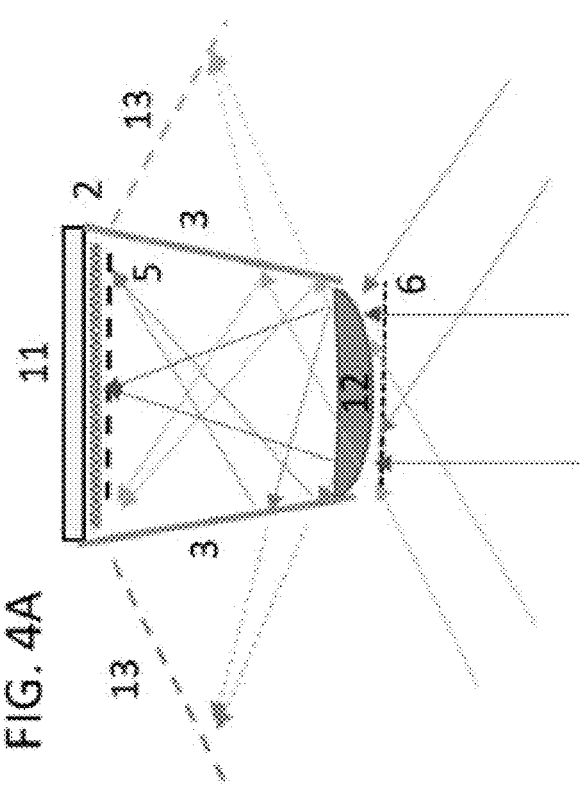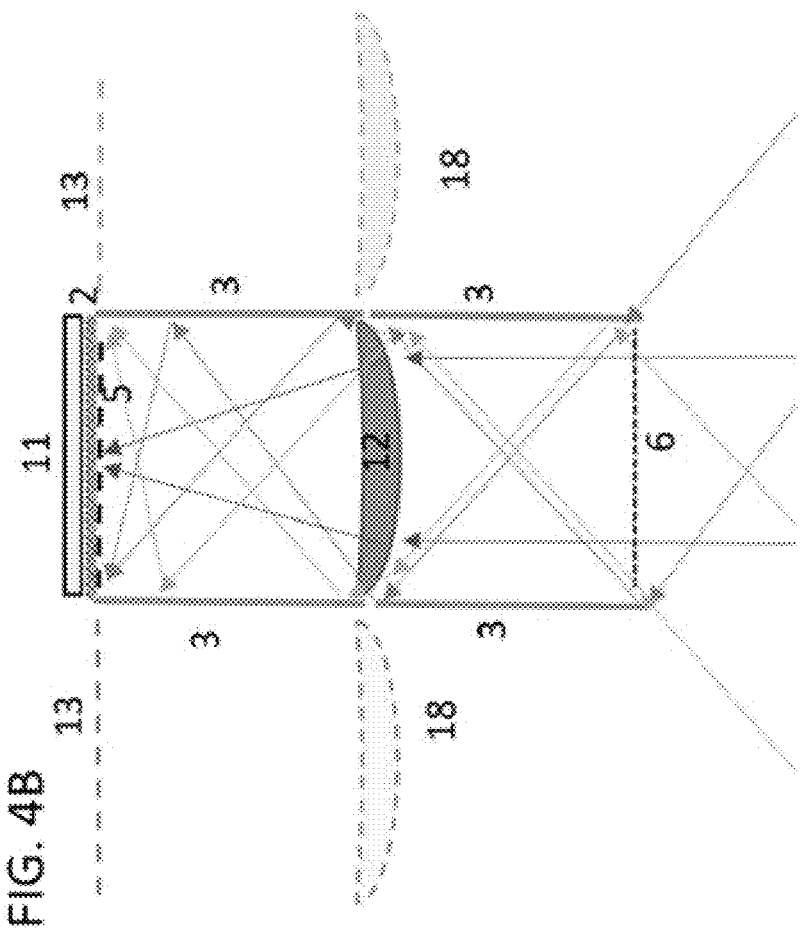
FIG. 4A
FIG. 4B

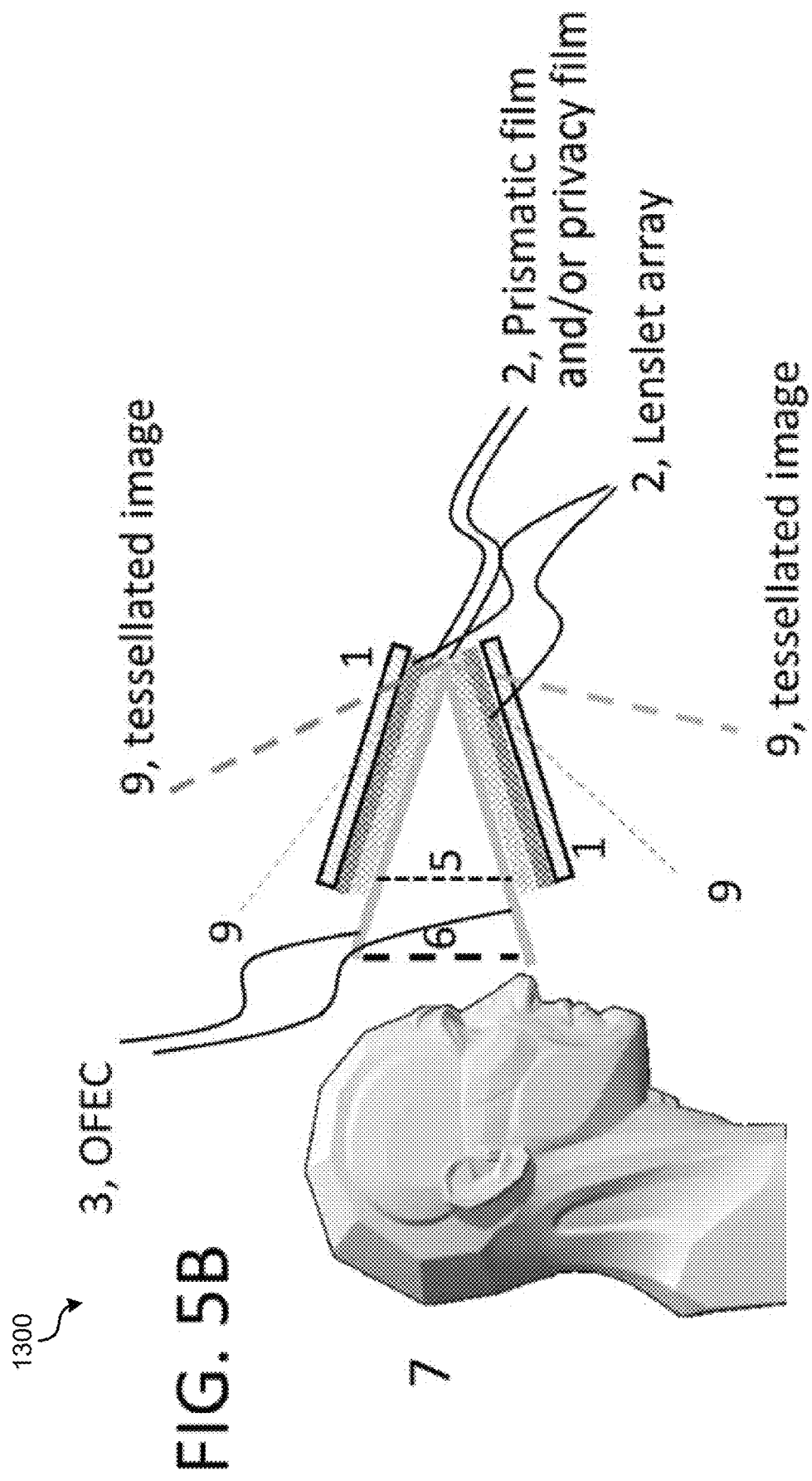

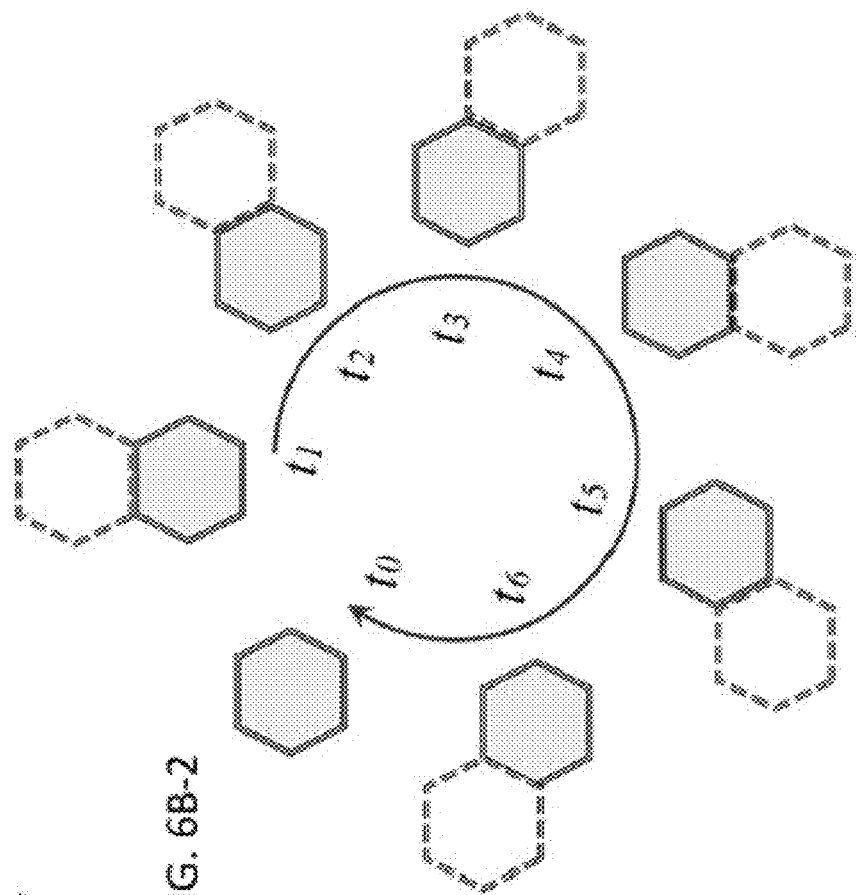
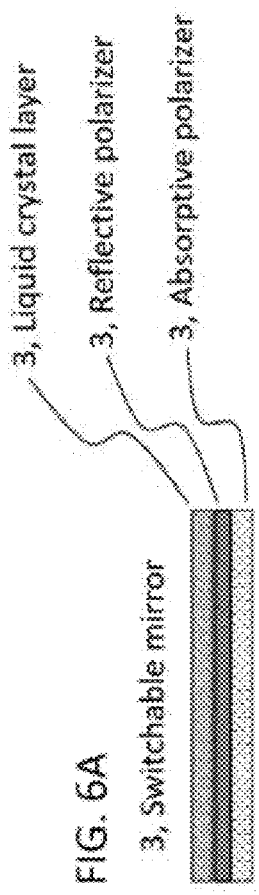
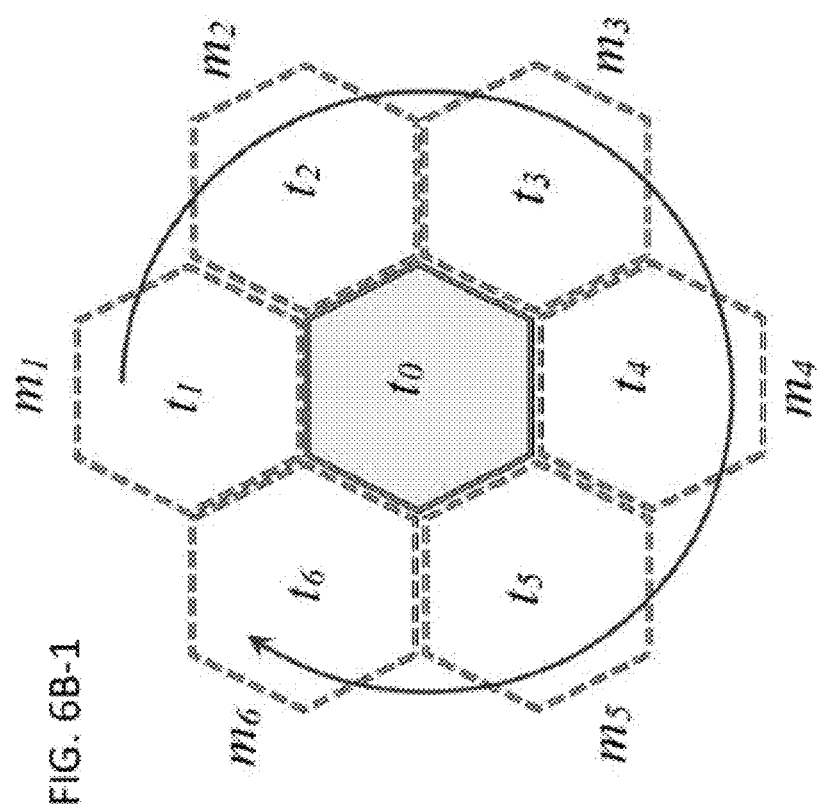
FIG. 6A
3, Liquid crystal layer
3, Reflective polarizer
3, Absorptive polarizer
3, Switchable mirror
FIG. 6B-1
FIG. 6B-2

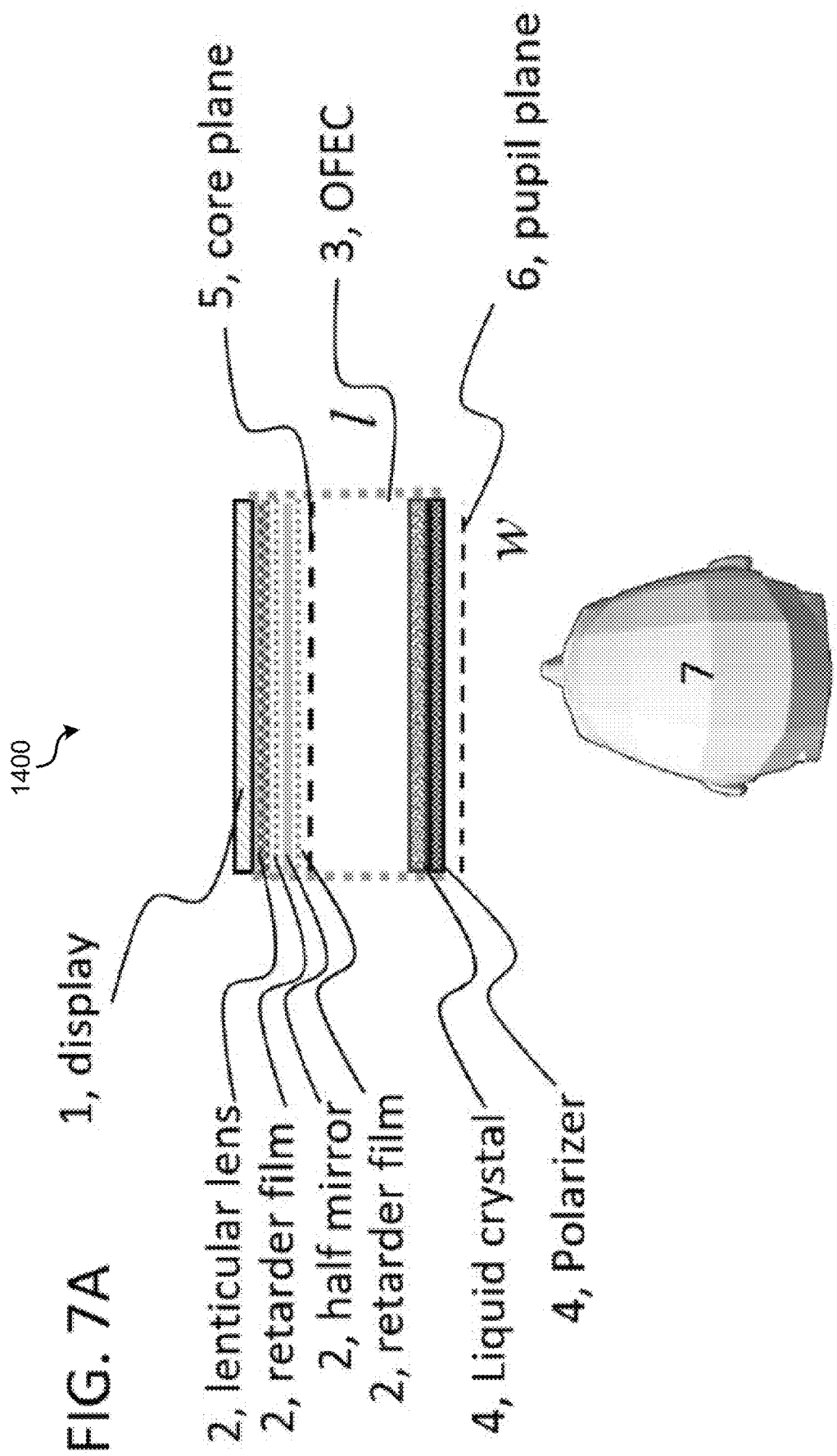

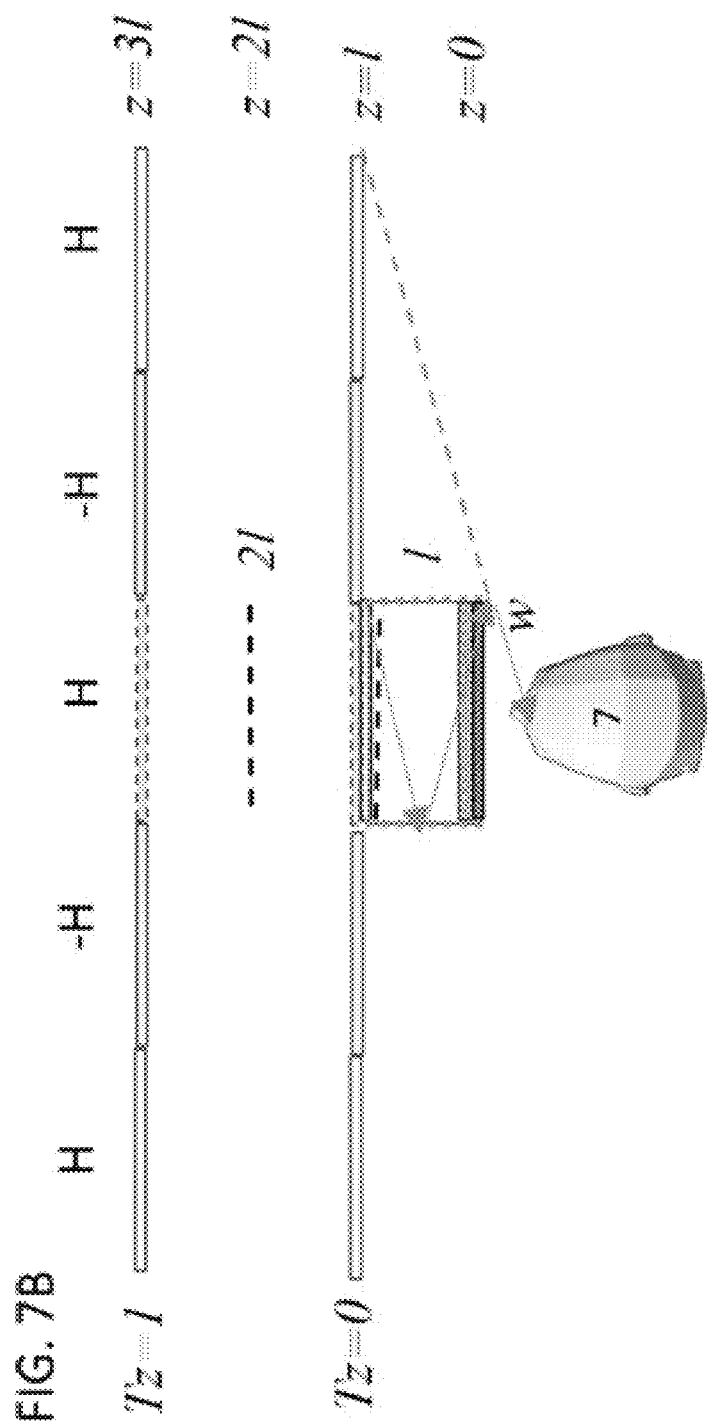

FIG. 7C  $(\alpha_{Tx,Tz}, \beta_{Ty,Tz}, H, V)$

| | | | | |
|---|---|---|---|---|
| $(\alpha_2, \beta_2, H, V)$ | $(\alpha_2, \beta_1, H, -V)$ | $(\alpha_2, \beta_0, H, V)$ | $(\alpha_2, \beta_0, H, -V)$ | $(\alpha_2, \beta_0, H, V)$ |
| $(\alpha_1, \beta_2, -H, V)$ | $(\alpha_1, \beta_1, -H, -V)$ | $(\alpha_1, \beta_0, -H, V)$ | $(\alpha_1, \beta_0, -H, -V)$ | $(\alpha_1, \beta_0, -H, V)$ |
| $(\alpha_0, \beta_2, H, V)$ | $(\alpha_0, \beta_1, H, -V)$ | $(\alpha_0, \beta_0, H, V)$ | $(\alpha_0, \beta_{-1}, H, -V)$ | $(\alpha_0, \beta_{-2}, H, V)$ |
| $(\alpha_1, \beta_2, H, V)$ | $(\alpha_1, \beta_1, H, -V)$ | $(\alpha_1, \beta_0, -H, V)$ | $(\alpha_1, \beta_{-1}, H, -V)$ | $(\alpha_1, \beta_{-2}, H, V)$ |
| $(\alpha_2, \beta_2, H, V)$ | $(\alpha_2, \beta_1, H, -V)$ | $(\alpha_2, \beta_0, H, V)$ | $(\alpha_2, \beta_{-1}, H, -V)$ | $(\alpha_2, \beta_{-2}, H, V)$ |

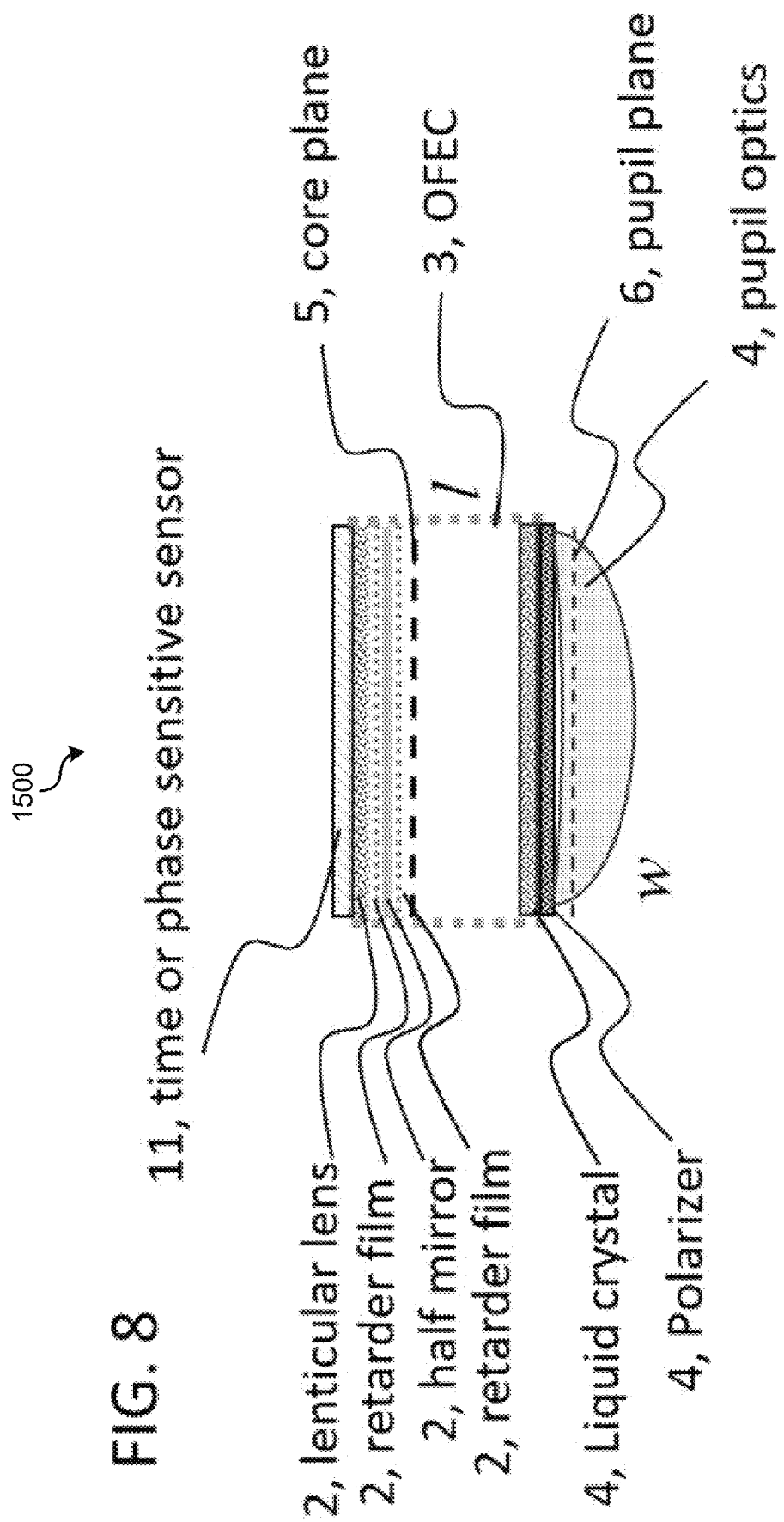

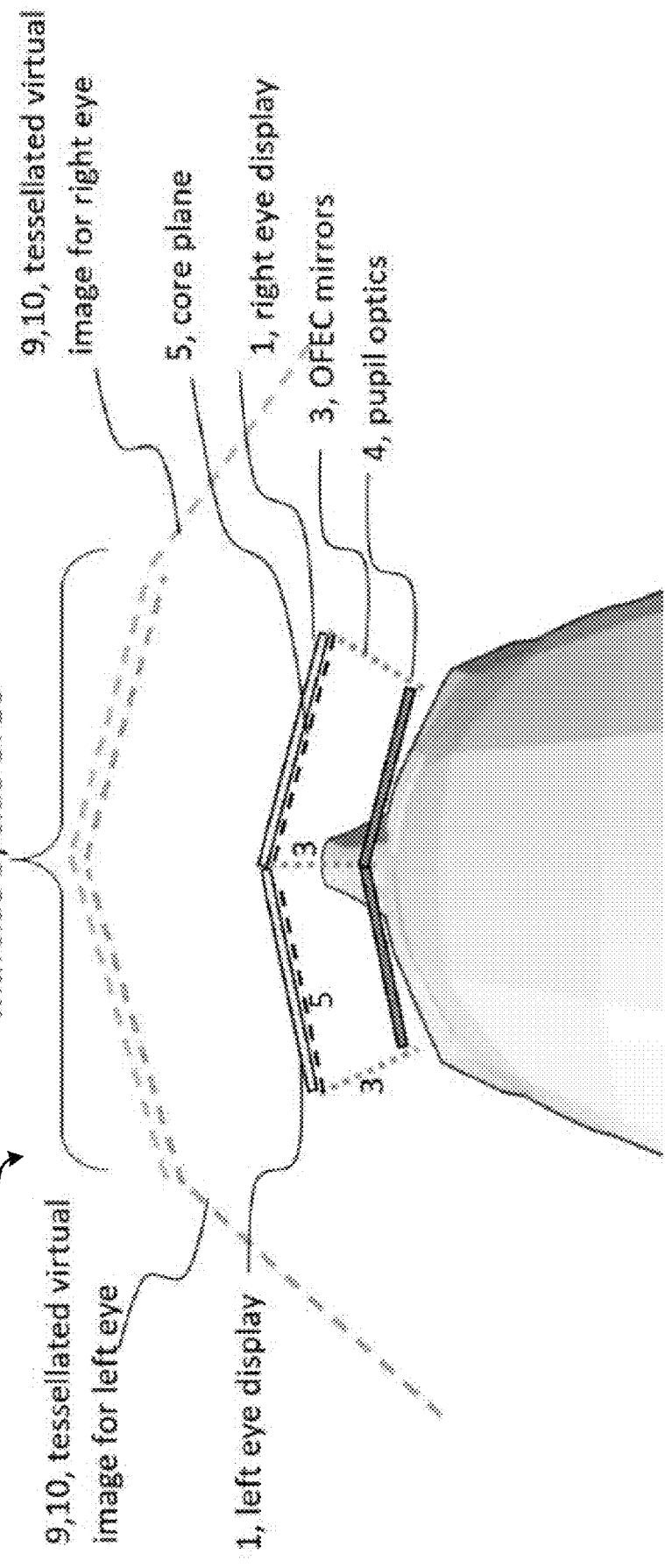

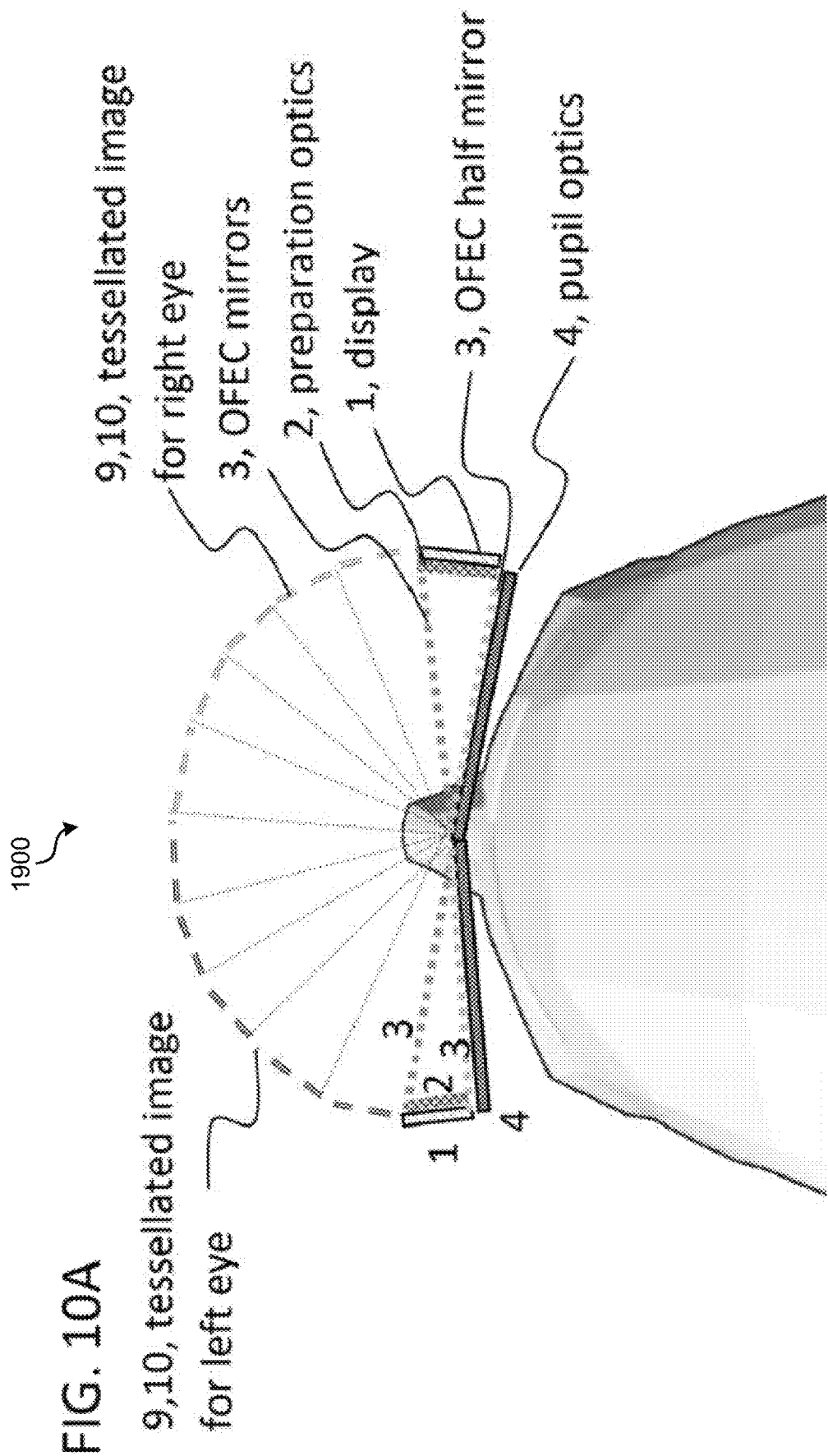

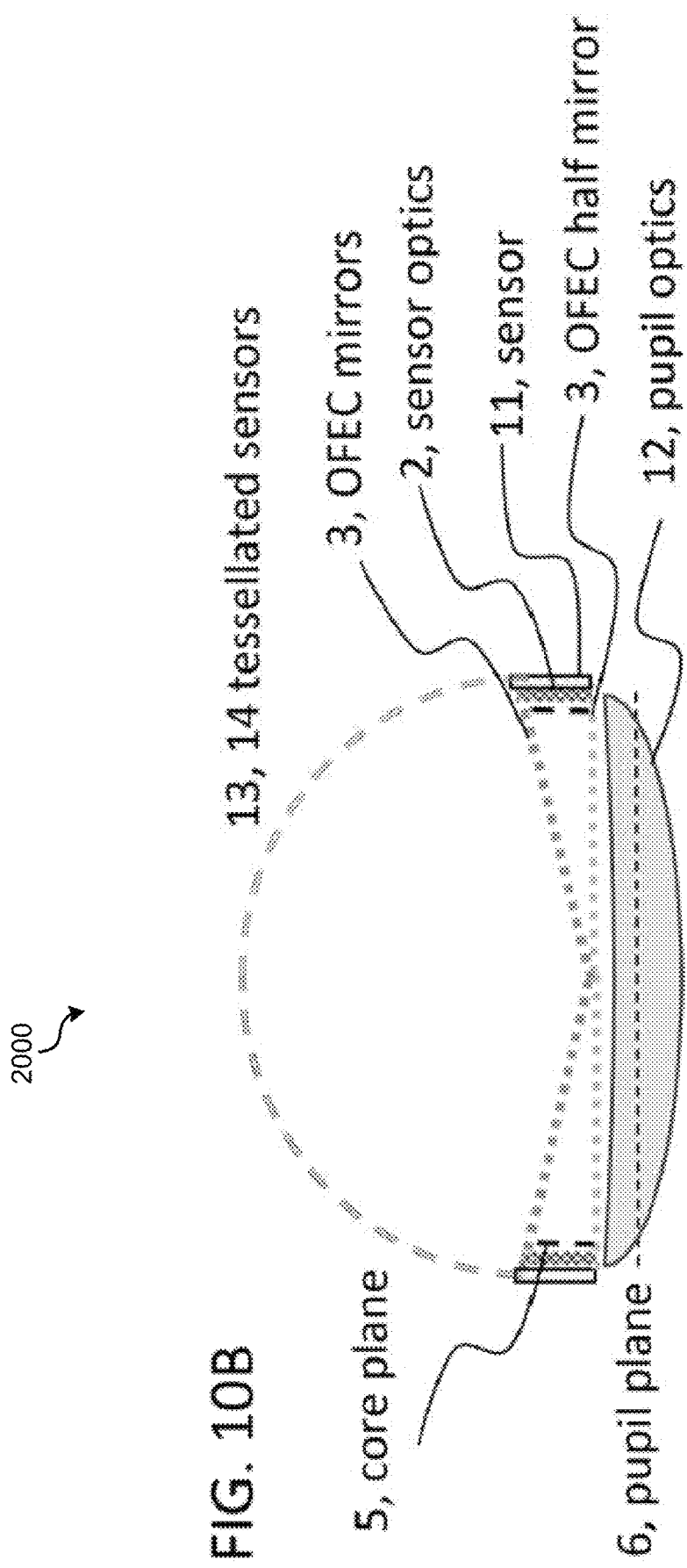

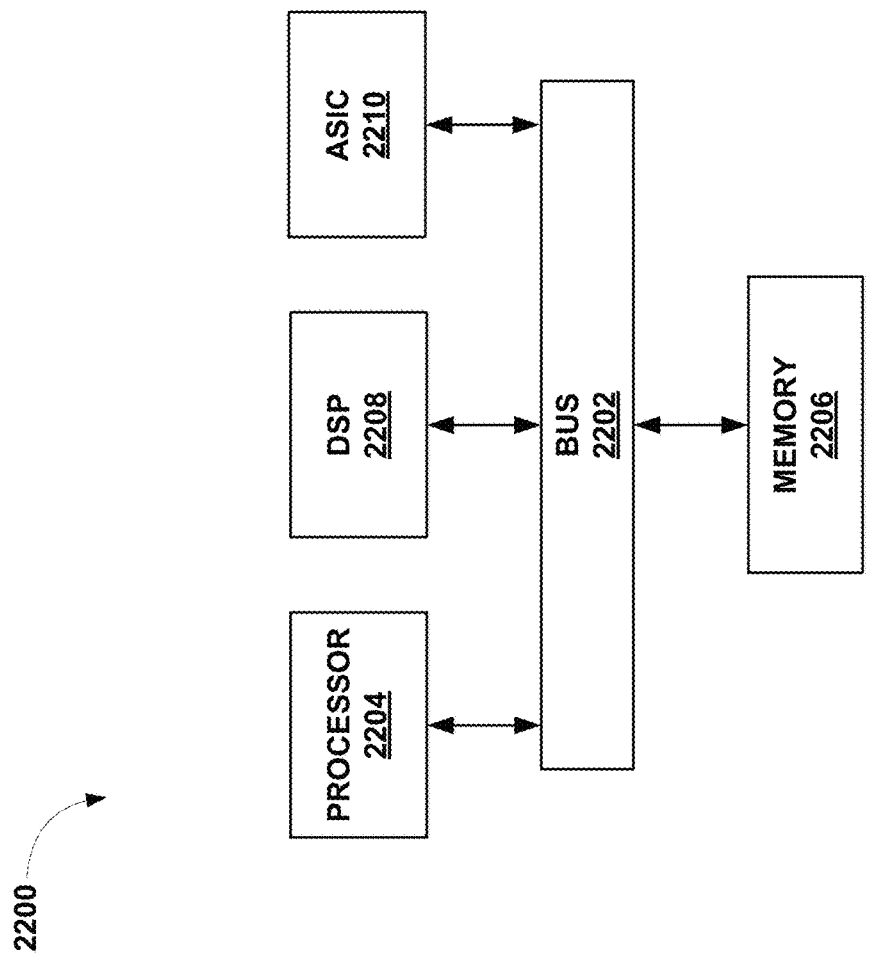

SYSTEMS AND METHODS FOR VIRTUAL LIGHT FIELD EXPANSION WITH ELECTRO-OPTICAL TESSELLATION

CROSS-REFERENCE TO RELATED APPLICATIONS

This application claims priority to U.S. Provisional Application No. 62/869,422 filed Jul. 1, 2019 and titled "SYSTEMS AND METHODS FOR VIRTUAL LIGHT FIELD EXPANSION WITH ELECTRO-OPTICAL TESSELLATION," which is incorporated herein by reference in its entirety.

TECHNICAL FIELD

The present disclosure generally relates to display and imaging systems. Particular embodiments of the present disclosure relate to systems and methods for expanding or tessellating a light field into a size or depth that is larger or further extended than a physical size of a pupil of an imaging system or a display system.

BACKGROUND

In the field of optics, an imaging system or a display system has historically been limited by an aperture size of the system where the light enters or exits the system. For cameras, this aperture size may limit the amount of light that may enter the camera. It may also dictate the sensor size that should be used with the camera. For displays, the pupil size is generally the same as the display frame size. For example, a 24" flat two-dimensional (2D) display has a 24" pupil physical size.

With the emergence of light field displays and virtual reality (VR) and augmented reality (AR) head mounted displays (HMD) in the past two decades, more intricate display systems have been developed to feed the eye in near eye modality. While there is ongoing research to make better light field displays that may provide monocular depth, i.e., true optical depth that one eye can focus on and does not require both eyes or stereopsis, there are fundamental challenges to enlarging the field of view (FOV) of these displays.

One such challenge is the fact that the two eyes have major overlap in their viewing zone, which makes it difficult to cover the binocular region with a given aperture size of a display. This is because the display for the left eye and the display for the right eye literally have to collide to provide image at the binocular overlap region. This gives VR displays a sense of looking through a binocular or two separate pipes.

The same effect gives light field displays a sense of looking through a long pipe. This is a natural problem for any type of three-dimensional (3D) display with true optical depth. This problem arises based on the fact that light travels in a straight path. This problem does not exist for stereoscopic 3D displays because such displays do not provide true optical depth and only uses parallax between left eye and right eye to provide binocular depth. However, a mere binocular depth without the correct monocular depth gives a nauseated sensation to the viewers as the eye is forced to verge at distances that each eye cannot accommodate on.

A similar problem limits the size of the sensor that may be used for an imaging apparatus. This is because the lenses are typically arranged in a pipe where the pipe itself blocks a set of more steep angles to reach the sensors or the rays that do not enter the aperture of the lens and pass in front of it.

SUMMARY

Implementations of the disclosure are directed to systems and methods for virtual light field expansion using electro-optical tessellation.

In one embodiment, a display system comprises: a display configured to emit light corresponding to an image; a first optical component positioned in front of the display, the first optical component configured to pass the light to an orthogonal field evolving cavity (OFEC) at a plurality of different angles; the OFEC, wherein the OFEC comprises a plurality of reflectors that are configured to reflect the light passed at the plurality of different angles to tessellate the size of the image to form a tessellated image; and a second optical component optically coupled to the OFEC, the second optical component configured to relay the tessellated image through an exit pupil of the display system.

In some implementations, the second optical component comprises a second FEC, wherein the second FEC is configured to change a depth of the image.

In some implementations, the display system is a near head display system, wherein the second optical component is configured as a curved visor.

In some implementations, the OFEC is configured to tessellate only a portion of the image, wherein the first optical component is positioned in front of a portion of the display that emits light corresponding to the portion of the image.

In some implementations, the display system is a near eye display system, wherein the OFEC is angled.

In some implementations, the display system is configured to sequentially turn each of the plurality of reflectors to reflective and absorptive.

In some implementations, the OFEC has a rectangular cross-section, wherein the plurality of reflectors comprise four reflectors. In other implementations, the OFEC has a hexagonal cross-section, wherein the plurality of reflectors comprise six reflectors.

In some implementations, the OFEC is a wedge-type OFEC, wherein the tessellated image is curved.

In some implementations, the OFEC is of second order or higher.

In some implementations, the plurality of reflectors are orthogonal to a plane of the image.

In some implementations, the display is a first display and the OFEC is a first OFEC, wherein the display system is configured as a stereoscopic display system, the stereoscopic display system comprising: a left eye display system, comprising: the first display, the first optical component, the first OFEC, and the second optical component; and a right eye display system, comprising: a second display configured to emit second light corresponding to a second image; a third optical component positioned in front of the second display, the second optical component configured to pass the second light to a second OFEC at a second plurality of different angles; the second OFEC, wherein the second OFEC comprises a second plurality of reflectors that are configured to reflect the second light passed at the second plurality of different angles to tessellate the size of the second image to form a second tessellated image; and a fourth optical component optically coupled to the second OFEC, the fourth optical component configured to relay the second tessellated image through a second exit pupil. In some implementations, the first OFEC and the second OFEC are wedge-type OFECs, wherein the first tessellated image and the second tessellated image are curved.

In some implementations, the display system further comprises: left and right speakers respectively protruding from left and right sides of the display system, wherein each of the speakers is configured to be placed in proximity to a respective ear of a user of the display system, but not in touching relation to the head of the user, to provide stereo or surround sound.

In one embodiment, a method comprises: displaying an image at a display of a display system; receiving, at a first optical component positioned in front of the display, light corresponding to the image; passing the light from the first optical component to an orthogonal field evolving cavity (OFEC) at a plurality of different angles, wherein the OFEC comprises a plurality of reflectors; reflecting, at the plurality of reflectors, the light passed at the plurality of different angles to tessellate the size of the image to form a tessellated image; and relaying, using a second optical component, the tessellated image through an exit pupil of the display system.

In one embodiment, an image capture system comprises: an aperture configured to receive light; a first optical component configured to converge the light received at the aperture; an Orthogonal Field Evolving Cavity (OFEC) optically coupled to the first optical component, the OFEC comprising a plurality of reflectors that are configured to reflect the light to tessellate the size of the first optical component or the size of an image sensor; a second optical component optically coupled to an output of the OFEC, the second optical component configured to multiplex light output by the OFEC to a plurality of different regions of an image sensor; and the image sensor.

In some implementations, the image sensor is positioned at a core plane, wherein the first optical component comprises a lens, wherein the OFEC is positioned at a back of the lens, wherein the plurality of reflectors are configured to reflect the converged light to tessellate the size of the image sensor.

In some implementations, the first optical component comprises a lens, wherein the OFEC is positioned in front of the lens, wherein the plurality of reflectors are configured to reflect the converged light to tessellate the size of the lens.

In some implementations, the first optical component is positioned within the OFEC, wherein the OFEC is configured to guide light rays into the first optical component, wherein the plurality of reflectors are configured to reflect the converged light to tessellate the size of the first optical component and the size of the image sensor.

In some implementations, the OFEC has a rectangular cross-section, wherein the plurality of reflectors comprise four reflectors, wherein the image capture system is configured to sequentially turn each of the plurality of reflectors reflective and absorptive to eliminate higher order tessellations.

In some implementations, the aperture is a first aperture, the OFEC is a first OFEC, and the image sensor is a first image sensor, wherein the display system is configured as a camera array, comprising: a first camera, comprising: the first aperture, the first optical component, the first OFEC, the second optical component, and the first image sensor; and a second camera, comprising: a second aperture configured to receive second light; a third optical component configured to converge the second light received at the second aperture; a second OFEC optically coupled to the third optical component, the second OFEC comprising a second plurality of reflectors that are configured to reflect the second light to tessellate a size of the third optical component or a size of a second image sensor; a fourth optical component optically coupled to an output of the second OFEC, the fourth optical component configured to multiplex light output by the second OFEC to a second plurality of different regions of the second image sensor; and the second image sensor.

In some implementations, the image capture system is configured to sequentially turn each of the plurality of reflectors to reflective and absorptive.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 1A shows a perspective view of a tessellation display system for displaying a larger tessellated image to a viewer, in accordance with implementations of the disclosure.

FIG. 1B shows a perspective view of a tessellation image capture system for tessellating an image sensor, in accordance with implementations of the disclosure.

FIG. 3B is a perspective view of the way a tessellation display system is perceived for near eye display tessellation via an OFEC, in accordance with some implementations of the disclosure.

FIG. 3D-1 is a perspective view of the way a tessellation display system is perceived for near head display tessellation with a curved back visor, in accordance with some implementations of the disclosure.

FIG. 3D-2 is a side view of the way a tessellation display system is perceived for near head display tessellation with a curved back visor, in accordance with some implementations of the disclosure.

FIG. 4A is a perspective view of a tessellation image capture system where the image sensor is at the core plane and is tessellated using an angled OFEC, in accordance with implementations of the disclosure.

FIG. 4B is a perspective view of a tessellation image capture system where the image sensor and the pupil optics are both tessellated using an extended OFEC, in accordance with implementations of the disclosure.

FIG. 5B shows a side view of an angled tessellation display system where the OFEC has a wedge-type configuration, in accordance with implementations of the disclosure.

FIG. 6A shows an OFEC comprising a switchable mirror comprising a bottom absorptive polarizer, a middle reflective polarizer, and a top liquid crystal layer.

FIG. 6B-1 conceptually illustrates implementations of electro-optical tessellation where a mirror of a hexagonal cross-sectioned OFEC is sequential turned ON and OFF, in accordance with implementations of the disclosure.

FIG. 6B-2 conceptually illustrate implementations of electro-optical tessellation where a mirror of a hexagonal cross-sectioned OFEC is sequential turned ON and OFF, in accordance with implementations of the disclosure.

FIG. 6C-1 conceptually illustrate implementations of electro-optical tessellation where a mirror of an OFEC having a rectangular cross-section is sequentially turned ON and OFF, in order to eliminate higher order tessellations, in accordance with implementations of the disclosure.

FIGS. 6C-2 conceptually illustrate implementations of electro-optical tessellation where a mirror of an OFEC having a rectangular cross-section is sequentially turned ON and OFF, in order to eliminate higher order tessellations, in accordance with implementations of the disclosure.

FIG. 7A shows a top view of a three-dimensional tessellation display system, having both an OFEC for expanding or tessellating an image's size, and a FEC for changing the image's depth, in accordance with implementations of the disclosure.

FIG. 7B illustrates an arrangement of tessellation vector indices where three dimensional tessellation may address or place an image at any position in three-dimensional space, depending on the order of the tessellation and FEC, in accordance with some implementations of the disclosure.

FIG. 7C is an exemplary matrix of a three-dimensional tessellation and arrangement of tessellation vector indices where the indices correspond to tessellating the core to 25 times larger than the core, in accordance with some embodiments.

FIG. 8 depicts an active tessellation image capture system (e.g., camera) with both a FEC for providing zooming/depth shift and an OFEC for tessellating the lens of the pupil optics or the image sensor, in accordance with implementations of the disclosure.

FIG. 9A depicts a tessellation display system including an array of tessellation displays for providing a stereoscopic display, in accordance with implementations of the disclosure.

FIG. 10A depicts a tessellation display system including two wedge-type OFEC that may be implemented in near head displays with stereopsis, in accordance with implementations of the disclosure.

FIG. 10B depicts a tessellation image capture system including two wedge-type OFEC that may be implemented to form a flat thin camera with a large lens, in accordance with implementations of the disclosure.

FIG. 11 illustrates a chip set in which embodiments of the disclosure may be implemented.

Figure 2A:
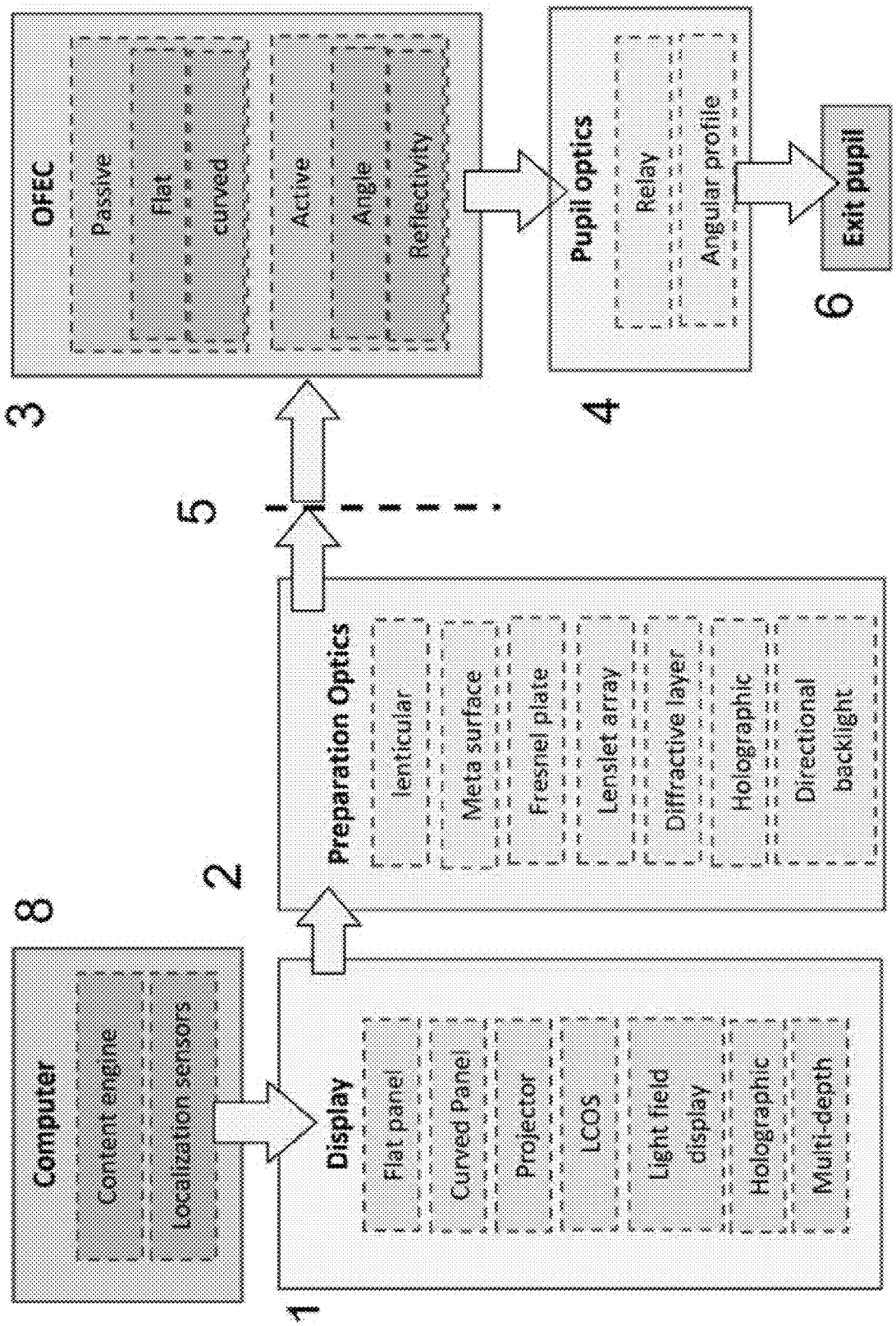
FIG. 2A is a block diagram illustrating electrical or optical communication in tessellation display system, in accordance with implementations of the disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As used herein, the term "optically coupled" is intended to refer to one element being adapted to impart, transfer, feed or direct light to another element directly or indirectly.

As used herein, the terms "Field Evolving Cavity" and "FEC" may refer to a non-resonant (e.g., unstable) cavity that allows light to reflect back and forth within it to evolve the shape of the wavefront associated with the light in a physical space. One example of a FEC may be comprised of two or more half-mirrors or semi-transparent mirrors facing each other. As described herein, a FEC may be parallel to a core plane or display plane (in case of display systems) or an aperture plane (in case of imaging systems). An FEC may be used for changing the apparent depth of a display.

As used herein, the terms "Orthogonal Field Evolving Cavity" and "OFEC" may refer to a FEC that is orthogonal or angled relative to a display plane or core plane. An OFEC may evolve a wavefront associated with light in an orthogonal or angled direction compared to a surface normal vector of a core plane at its center. One example of an OFEC may be comprised of two or more fully reflective mirrors facing each other or positioned in parallel perpendicular to the display surface plane.

As used herein, the "order of tessellation," "tessellation order," or variants thereof may refer to a number of reflections that light goes through before it comes out of an OFEC.

As used herein, the "order of an OFEC," "order of a FEC," "OFEC order," "FEC order," or variants thereof may refer to a number of round trips in a FEC or OFEC that light goes through. A "round trip" is referred to when the light that enters the cavity (either FEC or OFEC) will reflect the opposing reflector and come back to the entering surface.

All illustrations of the drawings are to be describing selected versions of the present invention and are not intended to limit the scope of the present invention. All references of user or users pertain to either individual or individuals who would utilize the present invention. Additionally, throughout this disclosure, the term "arbitrarily engineered" to refer to "of being any shape, size, material, features, type or kind, orientation, location, quantity, components, and arrangements of components with single or an array of components that would allow the present invention or that specific component to fulfill the objectives and intents of the present invention or that specific component with in the invention". In this disclosure lightfield at a plane refers to a vector field that describes the amount of light flowing in every or several selected directions through every point in that plane. Lightfield is the description of angle and intensity of light rays traveling through that plane.

In this disclosure depth modulation refer to change, programming or variation of monocular optical depth of the display or image. Monocular optical depth is a depth that directly refers to the curvature of the wavefront of the light and does not require both eyes or stereopsis to be perceived. Monocular depth is directly related to the distance of the object or an image or a display. When an emissive image (e.g., an illuminated object or a display) is moved further away from an observer the emitted light has to travel longer distance. Since each point emits a spherical wavefront, as the distance that light has propagated increases, the radius of the sphere increases, and the surface of the sphere also known as the wavefront will become more and more flat. This reduction in the curvature translate to deeper depth in human eye or a camera. Evolution of a wavefront refers to change in curvature of the wavefront as a result of propagation of light.

In this disclosure, display refers to an emissive display which can be based on any technology such as but not limited to Liquid Crystal Displays ("LCD"), Thin-film Transistor ("TFT"), Light Emitting Diode ("LED"), Organic Light Emitting Diode arrays ("OLED"), Active Matrix Organic Light Emitting Diode ("AMOLED"), projection or angular projection arrays on flat screen or angle dependent diffusive screen or any other display technology) and/or mirrors and/or half mirrors and/or switchable mirrors or liquid crystal sheets arranged and assembled in such a way as to exit bundles of light with divergence apex at different depths or one depth from the core plane or waveguide based displays. The display might be a near eye display for a headset, a near head display or far standing display. The application of the display does not impact the principle of this invention and this is what is referred to by an emissive display in this invention.

Throughout this disclosure the "angular profiling" may be achieved by holographic optical elements ("HOE"), diffractive optical elements ("DOE"), lens, concave or convex mirrors, lens arrays, micro lens arrays, aperture arrays, optical phase or intensity masks, digital mirror devices ("DMDs"), Spatial light modulators ("SLMs"), metasurfaces, diffraction gratings, interferometric films, privacy films or other methods. The intensity profiling may be achieved by absorptive or reflective polarizers, absorptive coatings, gradient coatings, or other methods. The color or wavelength profiling may be achieved by color filters, absorptive notch filters, interference thin films, or other methods. The polarization profiling might be done by metasurfaces with metallic or dielectric, micro or nano structures, wire grids, absorptive polarizers, wave plates such as quarter waveplates, half waveplates, 1/x waveplates or other nonlinear crystals with an isotropy.

All such these components can be arbitrarily engineered to deliver the desired profile. As used herein, "arbitrary optical parameter variation" refers to variations, change, modulation, programing and/or control of parameters which can be one or collection of following variations namely: optical zoom change, aperture size and aperture brightness variation, focus variation, aberration variation, focal length variation, time-of-flight or phase variation in case of an imaging system with time sensitive or phase sensitive imaging sensor, color variation or spectral variation in case spectrum sensitive sensor, angular variation of captured image, variation in depth of field, variation of depth of focus, variation of coma, variation of stereopsis baseline in case of stereoscopic acquisition, variation of field of view of the lens.

Throughout this disclosure, the imaging sensor might use "arbitrary image sensing technologies" to capture light or a certain parameter of light that is exposed onto it. Examples of such "arbitrary image sensing technologies" include: complementary-symmetry metal-oxide-semiconductor ("CMOS"), Single Photon Avalanche Diode ("SPAD") array, Charge Coupled Device ("CCD"), Intensified Charge Coupled Device ("ICCD"), Ultra-fast Steak sensor, Time-of-Flight sensor ("ToF"). Schottky diodes or any other light or electromagnetic sensing mechanism for shorter or longer wavelength.

As used herein, "imaging system" refers to any apparatus that acquires an image that is a matrix of information about light intensity and/or its other, temporal, spectral, polarization or entanglement or other properties used in any application or frame work such as cellphone cameras, industrial cameras, photography or videography cameras, microscopes, telescopes, spectrometers, time-of-flight cameras, ultrafast cameras, thermal cameras, or any other type of imaging system. In this disclosure, "cross-polarized" refers to the situation where the polarization of the incident light is orthogonal to the pass axis of a polarizer and the pass axis is the axis or the vector that the light with polarization at such vector passes through a linear polarizer.

As discussed above, there are fundamental challenges to enlarging the FOV of some present light field display systems and imaging systems. Such systems may not be capable of removing the pipe effect and expanding the range of angles that may exit or enter the aperture via optical or electro-optical tessellation. Further, such systems may not be capable of enabling a much larger set of angles to be able to be captured by the aperture of a camera. Moreover, such systems may not be capable of enabling an image sensor area to be optically expanded, allowing capture of a larger image with a smaller image sensor or capture of a larger image with a smaller lens pupil.

Therefore, there is a need for improved methods and systems for expanding or tessellating a light field into a size or depth that is larger or further extended than the pupil size of an imaging system or display system that may overcome one or more of the above-mentioned problems and/or limitations.

To this end, various implementations of the disclosure are directed to systems and methods for virtual light field expansion using electro-optical tessellation. In accordance with the techniques described herein, a display, image sensor, or pupil of an optical system may be optically expanded or tessellated. In accordance with implementations described herein, a system may include a microstructure layer that may guide and/or capture light at different specific angles matched to different orders of an OFEC with a variety of geometrical cross sections. This configuration may optically expand a sensor size, a display or screen size, a camera aperture size, etc.

In accordance with implementations of the disclosure, the OFEC may be configured to evolve the wavefront in such a way that at the exit pupil of the system, the display, the sensor, or lens aperture appears much larger than its physical size. The OFEC may contain a plurality of reflective surfaces with electronic polarization control. The plurality of reflectors may surround the layer with a microstructure in an orthogonal fashion to create a FEC that replicates a core plane to different distances at different angles. In accordance with implementations, further described herein, light rays may be configured to enter and/or exit the core plane to provide tessellation via the OFEC. In accordance with implementations, further described herein, the OFEC may be programmed sequentially to provide the tessellation. In accordance with implementations, further described herein, the OFEC may be combined with a FEC to provide tessellation in three dimensions. In some implementations, one or more sensors may be utilized to correct or calibrate the image shown or captured by an apparatus.

FIGS. 1A-1B depict systems for optically or electro-optically expanding or unfolding or tessellating a light field into a larger spatial size.

FIG. 1A shows a perspective view of a tessellation display system 100 for displaying a larger tessellated image to a viewer 7, in accordance with implementations of the disclosure. The tessellation display system 100 includes a display or other image generation device 1, preparation optics or optical components 2 configured to provide directional variation or "angular profiling" of light to each pixel, OFEC 3, pupil optics or optical components 4, and exit pupil 6. The display system 100 is communicatively coupled to a computer 8, which generates and/or captures content, and in some embodiments, adjusts it based on the location of the viewer 7. Also depicted is a core plane 5, which is a hypothetical plane that is expanded virtually via optical or electro-optical tessellation. The first order tessellated display area 9 corresponds to light having reflected once inside OFEC 3. The second order tessellated display area 10 refers to the area that is tessellated by two reflections within facets of OFEC 3. As depicted in this example, the OFEC 3 has a square cross-section, although in other implementations it may have a different cross-sectional shape. The preparation optics 2 may include a set of layers or structures placed at the core plane 5 that achieve "angular profiling" of the light.

FIG. 1B shows a perspective view of a tessellation image capture system 200 for tessellating an image sensor, in accordance with implementations of the disclosure. Image capture system 200 may, for example, correspond to a camera. The tessellation image capture system 200 includes an image capture device or image sensor 11, preparation optics or optical components 2, OFEC 3, aperture 6, and pupil optics or optical components 12. The pupil optics or optical components 12 may be implemented as an imaging lens or lens group. Also depicted are the first order tessellated sensor 13 and the second order tessellated sensor 14. Via tessellation, the image sensor appears to be much larger to the aperture 6 than its actual size. In this specific example, with second order tessellation, the image sensor appears to be 18 times larger in area. As the foregoing examples illustrate, the OFEC 3 is a category of FEC that may generate different orders (e.g., round trips that light travels between mirrors) to further expand a core plane.

Figure 13:
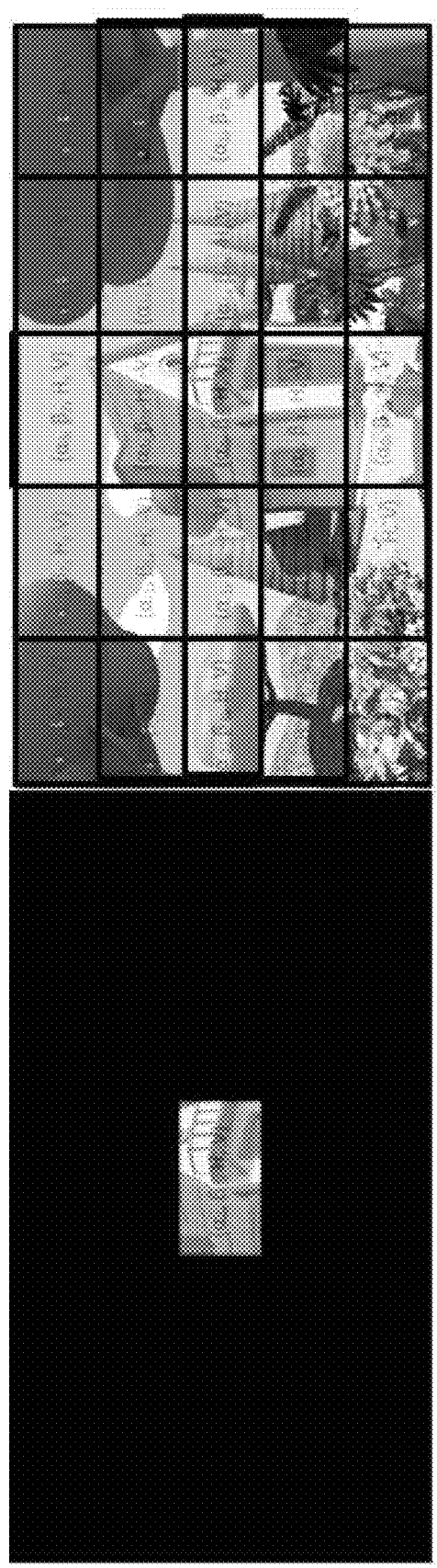
FIG. 13 conceptually depicts an example display with, and without, tessellation.

FIG. 13 conceptually depicts an example display with, and without, tessellation. Both in the display system and imaging system, if there is no tessellation then the effect is only the center tile is visible. With tessellation a concentric light field that increases the size of the image that is seen or captured is created.

As the foregoing examples illustrate, a display system or imaging system in accordance with implementations described herein may primarily include an OFEC 3, a set of preparation optics/optical components 2, pupil optics/optical components 4 or 12, and an image generation device (e.g., display) 1 or image capture device (e.g., image sensor) 11. In some implementations, the display or camera sensor may be a single pixel or an array of pixels. It may be 2D or 3D. The virtual unfolded light field (depicted as 9,10 in FIG. 1A and 13,14 in FIG. 2) may be referred to as an expanded plane or tessellated plane that is larger than the physical size of the core plane 5. In both examples, the core plane 5 is a hypothetical plane that is expanded virtually via optical or electro-optical tessellation. This plane may be on top of a display plane, an image sensor, or a lens pupil, or it may optically tessellate any plane within the OFEC. As further described herein, the optical expansion that is provided by the OFEC 3 may be the result of angle selectivity of the OFEC that assigns different sets of rounds trips to different angles.

In implementations, the OFEC 3 cavity primarily contains a set of mirrors or reflecting surfaces facing each other. It may also be preferred that the reflectors are orthogonal or slightly angled to the image plane or core plane 5. The OFEC may evolve or unfold the light field. Orthogonal in this disclosure may refer to being non-parallel to a core plane such that the cavity reflectors are not parallel to the plane of the image. In some implementations, the OFEC 3 comprises facets that are simple flat mirrors orthogonal or slightly angled relative to the core plane. In some implementations, facets of the OFEC 3 have a slight curve. In some implementations, facets of the OFEC 3 may be switched from reflective to absorptive so that each facet can be controlled electronically to create a selectivity mechanism for the facets. In some implementations, the facets make a symmetrical polygon geometry so that the core cross section may tessellate the virtual space without gaps between the tessellation facets. In some implementations, the angle of each of the facets of OFEC 3 may be switched electronically by using switchable mirrors to change the shape of the tessellated image electronically. In some implementations, the OFEC facets might be semi-reflective to allow arraying of several OFEC next to each other.

FIG. 2A is a block diagram illustrating electrical or optical communication in tessellation display system 100, in accordance with implementations of the disclosure. In particular, FIG. 2A illustrates computer 8, display 1, preparation optics or optical components 2, core plane 5, OFEC 3, pupil optics or optical components 4, and exit pupil 6.

Figure 2B:
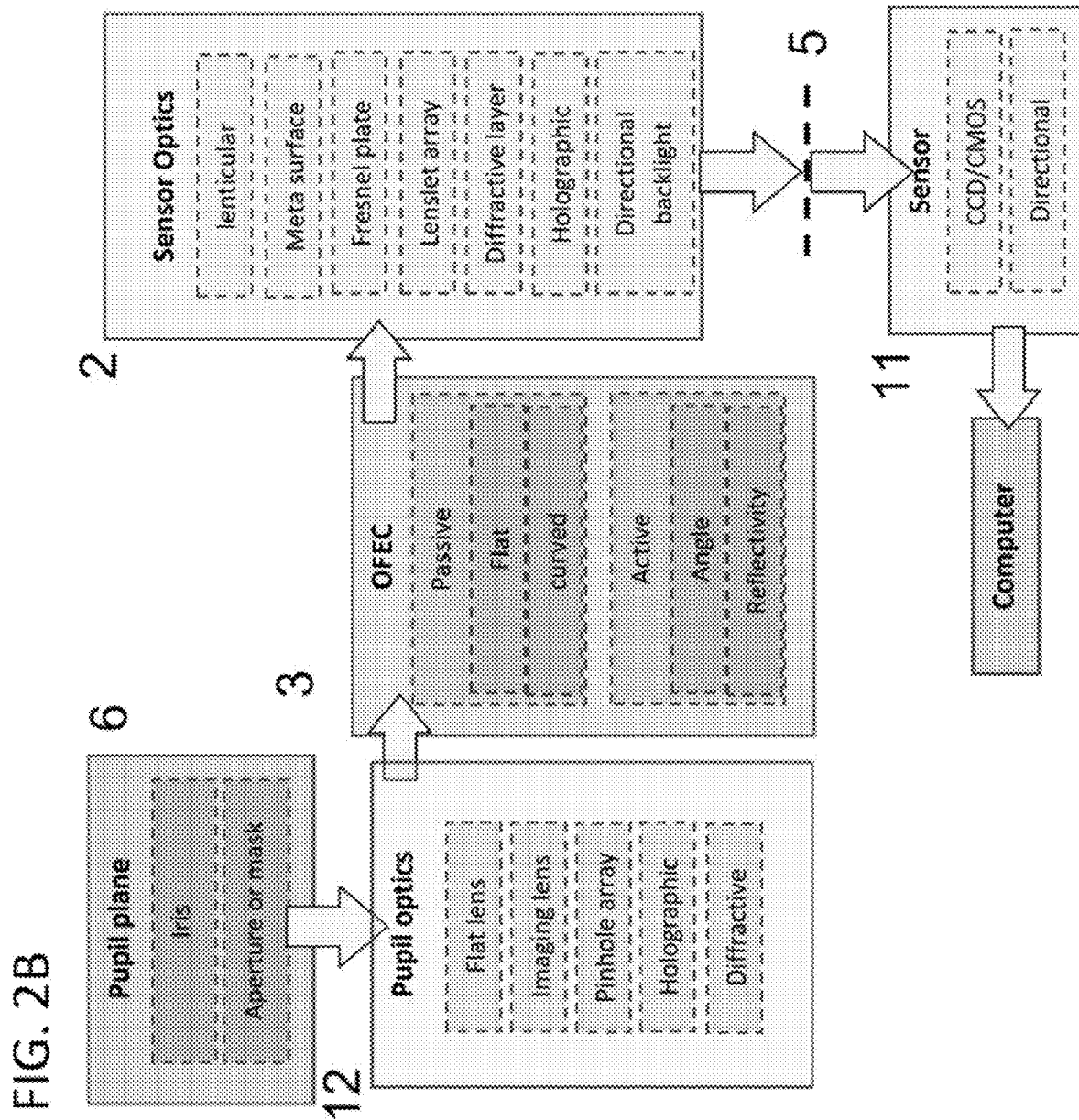
FIG. 2B is a block diagram illustrating communication between components of tessellation image capture system, in accordance with implementations of the disclosure.

FIG. 2B is a block diagram illustrating communication between components of tessellation image capture system 200, in accordance with implementations of the disclosure. In particular, FIG. 2A illustrates pupil plane or aperture 6, pupil optics or optical components 12, OFEC 3, sensor optics or optical components 2, core plane 5, image sensor 11, and a computer.

Figures 2, 6C:
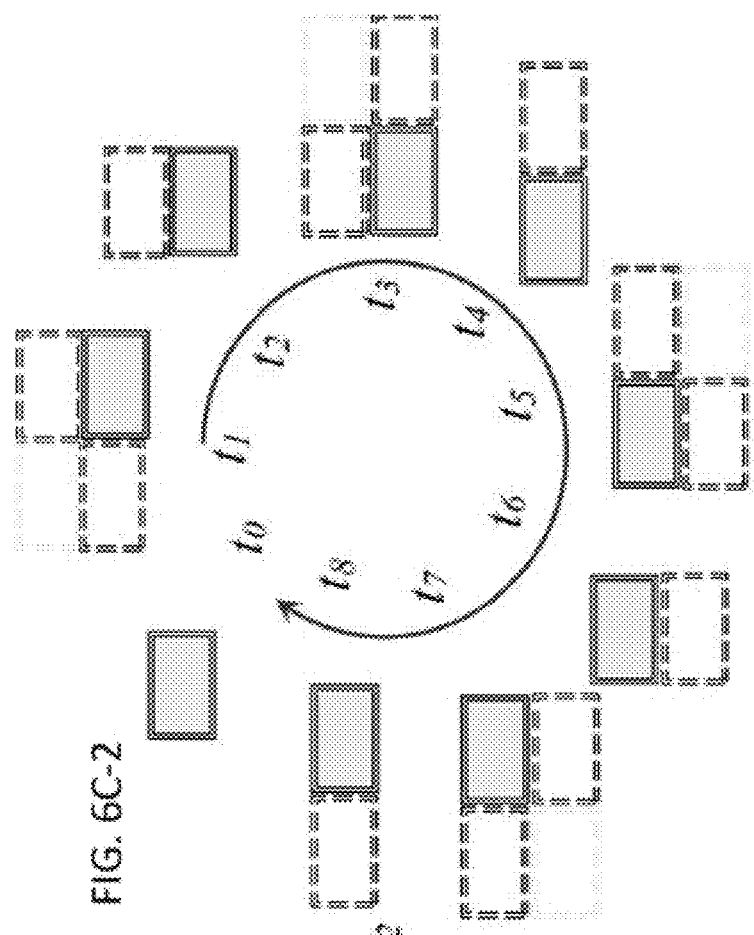
Figures 1, 6C:
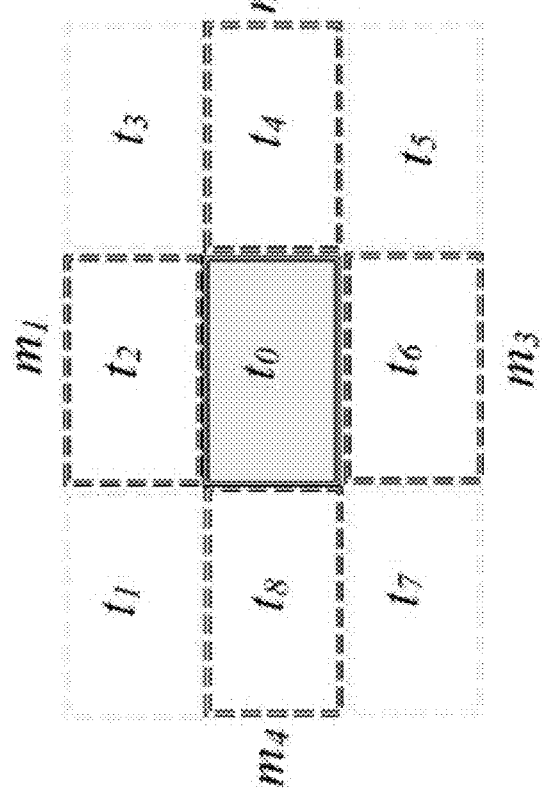

In some implementations, the display 1 may be positioned behind the preparation optics 2, as illustrated in FIG. 1, and further illustrated in FIG. 3A, FIG. 3B, FIG. 3C, FIG. 3D-1, and FIG. 3D-2, described below. The display 1 may be provided, by computer 8, all the image content that needs to be expanded optically through the OFEC 3. In some implementations, the display 1 may be an autostereoscopic display where the image seen at the exit pupil 6 of the apparatus appears to be 3D because of the parallax perceived by left and right eye. In some implementations, the display 2 may be a light field display where the depth is provided with a parallel set of FEC structures or projector arrays or directional backlights or directional laser arrays.

Preparation optics 2 (also referred to as sensor optics 2 in the case of image capture system 200) is configured to display light differently at different angles (e.g., in the case of tessellation display system 100) or capture light differently at different angles (e.g., in the case of image capture system 200). As depicted by FIGS. 2A-2B, one or more types of optical components may be utilized in preparation optics 2. The preparation optics 2 may comprise a plurality of layers. The plurality of layers may send or receive light at a distinct or continuum set of angles while providing minimal cross talk between the angles. This distinct set of angles may be achieved using a lenslet array such as lenticular lenslet arrays or diffractive layers or laser diode arrays that provide directional backlight in case of displays or directional feed to each pixel in case of imaging sensor. In the case of image capture system 200, the preparation optics 2 may preferably comprise a lenslet array positioned on an image sensor 11.

Figure 12:
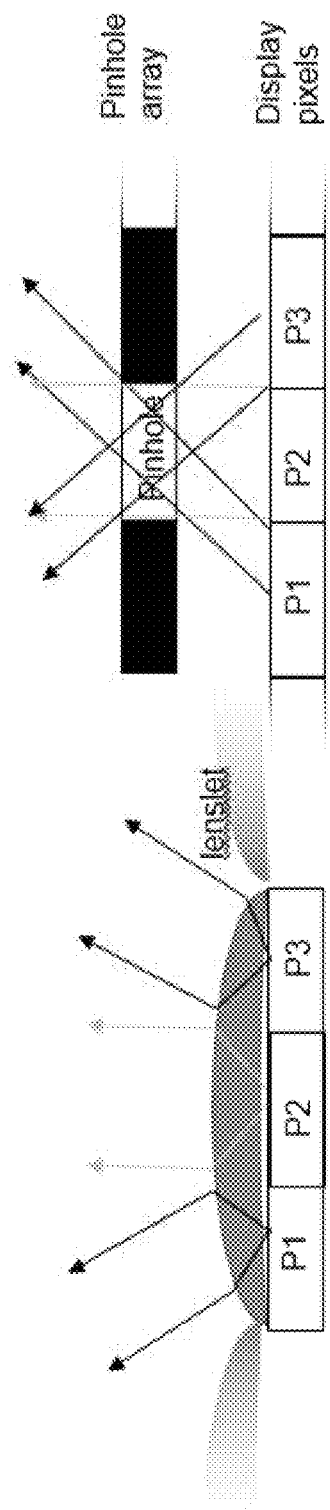
FIG. 12 shows how a lenslet array or pinhole array may be aligned in such a way to send different angles of light to different OFEC mirrors, in accordance with implementations of the disclosure.

By way of illustration, consider FIG. 12, which shows how a lenslet array or pinhole array may be aligned in such a way to send different angles of light to different OFEC mirrors, in accordance with implementations of the disclosure. For example: one image may go to 0 degrees, one to 45 degrees and the other goes to −45 degrees. The same may apply for vertical angles and diagonal angles. In some cases the angle has to slightly shift from side to side to provide less cross talk between the angels. The reason for that is that the angles of the viewers eye with the display varies slightly from the left side of the display to the right side of the display, the viewer is not looking at the core display exactly in a perpendicular manner.

In some implementations, the preparation optics 2 may be a holographic film configured to capture the light or holographic display. In some implementations, the preparation optics 2 is a periodic holographic pattern that feeds or exits the light from each pixel or each sensor at different angles. In some implementations, the preparation optics 2 is a set of periodic clusters of microstructures or nanostructures such as those done on met surfaces to provide angle dependent profile to the layer. In some implementations, the preparation optics 2 may be active and allow the capture or emission of the image at different angles or locations at different times. In some implementations, the preparation optics 2 may be an array of microfibers or a periodic mesh that allows the angular profile of the light to be separated from each reflection within the OFEC 3.

Pupil optics 4 or 12 is configured to relay light. As depicted by FIGS. 2A-2B, one or more types of optical components may be utilized in pupil optics. The pupil optics may be relay optics such as lenses or curved reflectors or waveguides in the case of display devices (e.g., as further illustrated in FIG. 3A, FIG. 3B, FIG. 3C, FIG. 3D-1, and FIG. 3D-2 described below) and imaging devices (e.g., as further illustrated in FIG. 4A, FIG. 4B, and FIG. 4C described below). The pupil optics 4 or 12 may assist in creating depth for the display or they may assist in coupling of the light from the apparatus to the outside world (viewer's eyes in case of display) or from the outside world into the apparatus in case of capturing and sensing.

Figure 2C:
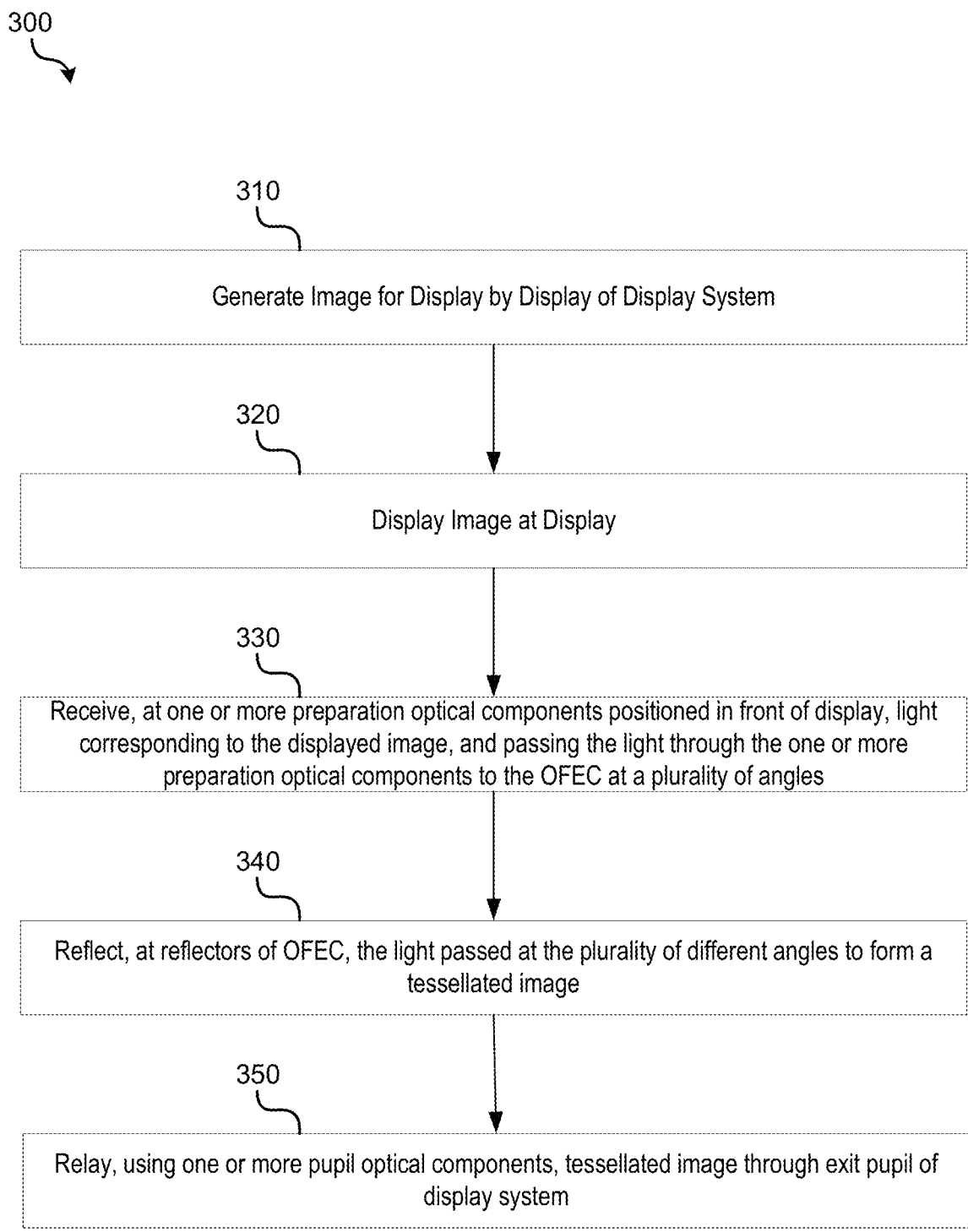
FIG. 2C is an operational flow diagram illustrating an example method that may be implemented by the tessellation display system, in accordance with implementations of the disclosure.

FIG. 2C is an operational flow diagram illustrating an example method 300 that may be implemented by the tessellation display system 100, in accordance with implementations of the disclosure. In some instances, method 300 may be implemented in response to a processor executing instructions stored on a non-transitory computer readable medium. At operation 310, computer 8 generates an image for display by display 1. In some implementations, the image is a video frame.

In some implementations, the generated image may be calibrated prior to being sent to a directional display. For example, the generated image may be calibrated based on a signal received from a localization sensor that tracks movement of the user 7. As depicted by FIG. 2A, the computer 8 may control a content engine and a plurality of localization sensors or other sensors that may be used for content adjustment in interactive embodiments. The sensors may be of a shape, size, material, features, type or kind, orientation, location, quantity, components, and arrangements of components such that the plurality of sensors can include tracking sensors, localization sensors, other similarly-related objects, other similarly-relevant objects, and/or any combination of the aforementioned items. Such sensors can also include but are not limited to the following: mapping sensors, camera sensors, time-of-flight sensors, dual mono camera sensor rigs, eye-tracking sensors, hand-tracking sensors, head-tracking sensors, etc.

Figure 3A:
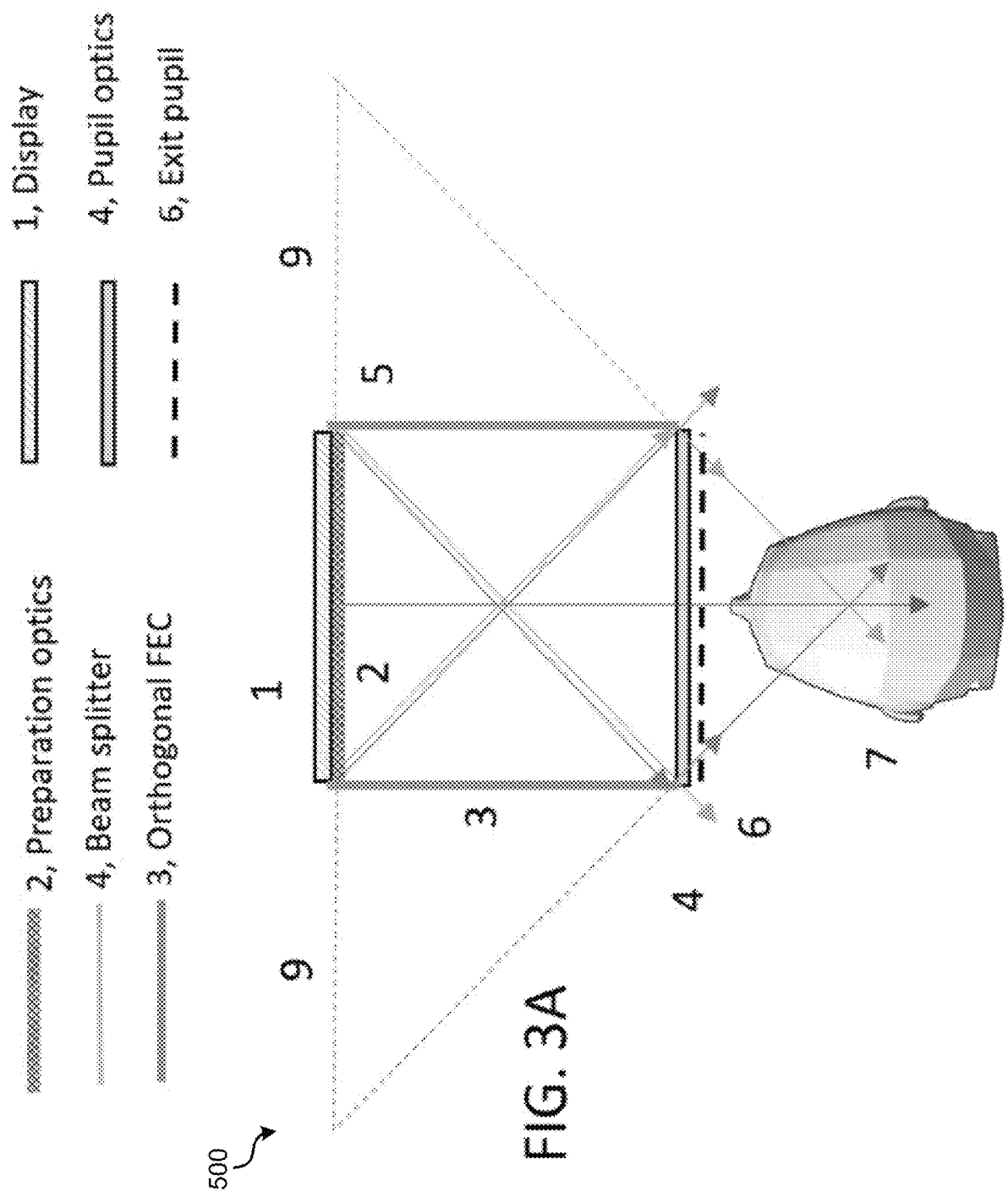
FIG. 3A is a perspective view of the way a tessellation display system is perceived for a near head display implementation where the core display is tessellated to a larger size, in accordance with implementations of the disclosure.

In some implementations, data from the localization sensor may assist correction of the image that a display 1 is showing in such manner that the image remains intact to the viewer's eyes as he or she moves closer or further or to the left or right of the exit pupil 6 of the display system. In FIG. 3A, further described below, a localization sensor is attached to the display 1. In embodiments where a tessellated near-head display is attached to a chair; the localization sensor may be used to change the content as the user revolves his chair to left or right to provide a continuous large monitor experience that fully surrounds the user in 360 degrees.

At operation 320, the display 1 displays the image. Depending on the implementation, the image may be displayed in 2D, in 3D, or in multidepth format. At operation 330, one or more preparation optics 2 positioned in front of the display 1 receives corresponding to the displayed image, and the light is passed through the one or more preparation optics 2 to an OFEC 3 at a plurality of angles. As such, the preparation optics 2 may be configured to take the light emitted by the display 1, and feed the light at desired angles to the OFEC 3.

At operation 340, the OFECs reflectors reflect the light passed at the plurality of different angles to form a tessellated image from the image. In particular, the OFEC 3 folds or unfolds the light in different angles and depth to form a bundle of lights ("light bundle") that appears to be coming from a virtual display that is larger than the physical display 1 and that appears to be coming from a distance further away than the physical display 1. As such, the light that ultimately exits the exit pupil 6 may appear to the user 7 to be coming from a much bigger (e.g., 8-20 times larger in area) virtual display at a further away distance. This bundle of lights that converges at the user's face may be referred to as a concentric light field. In this instance, light from each pixel is not converging but the total light from all pixels is going toward the same region, similar to an array of flash lights on a curved surface in front of a user's face.

At operation 350, the tessellated image is relayed through one or more pupil optical components 4 to exit pupil 6. In particular, the light bundle transmitted by the OFEC 3 may be relayed. The light that exits the system is received by the user's eyes. In some implementations, the one or more pupil optical components 4 may further enhance the angular profile of the light. In some implementations, the one or more pupil optical components 4 may be configured as a polarizer that eliminates unwanted reflections inside the OFEC 3. In some implementations, the one or more pupil optical components may function as a baffle.

Figure 2D:
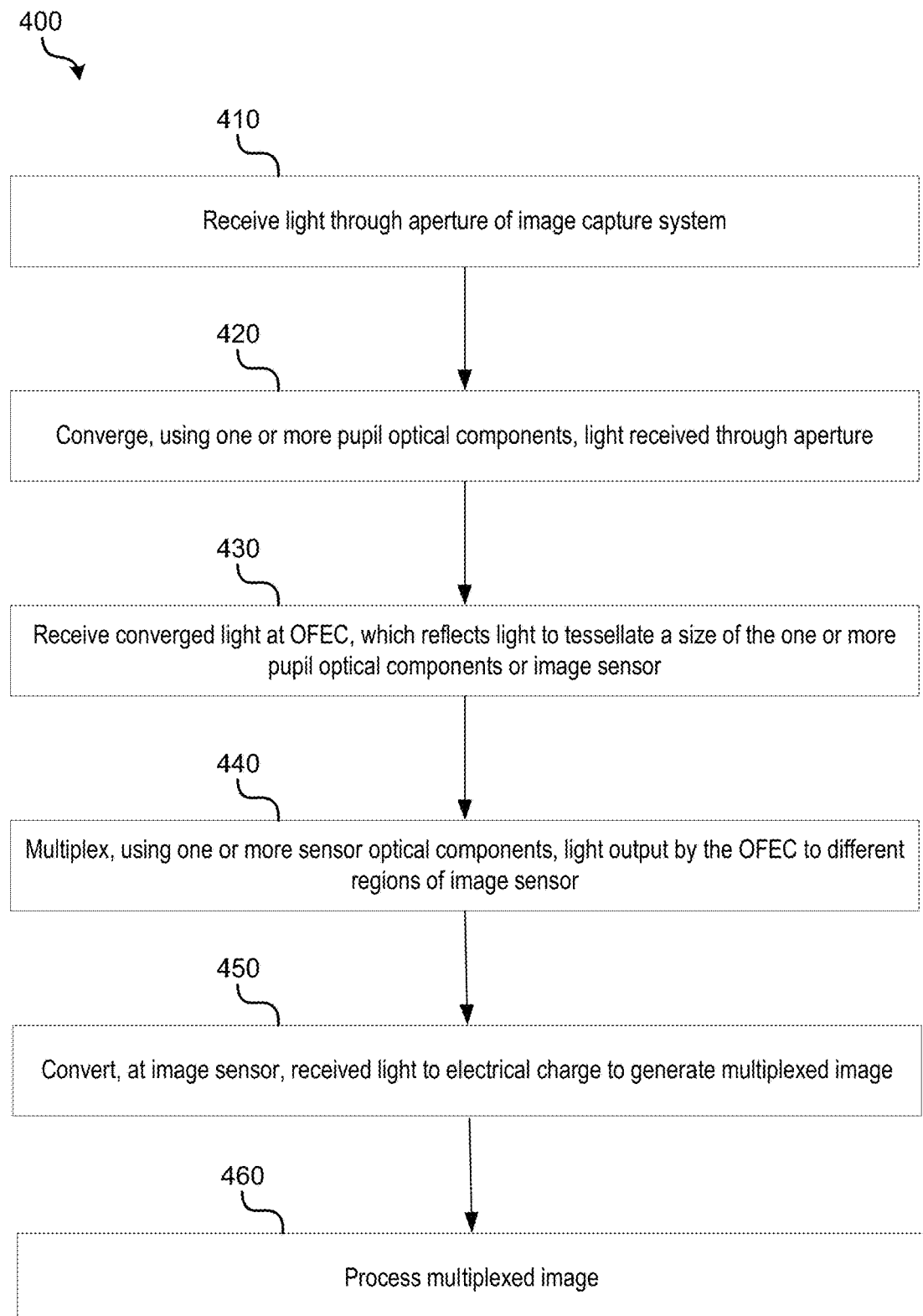
FIG. 2D is an operational flow diagram illustrating an example method that may be implemented by the tessellation image capture system, in accordance with implementations of the disclosure.

FIG. 2D is an operational flow diagram illustrating an example method 400 that may be implemented by the tessellation image capture system 200, in accordance with implementations of the disclosure. In some instances, method 400 may be implemented in response to a processor executing instructions stored on a non-transitory computer readable medium.

At operation 410, light from the outside world enters the aperture 6 of system 200. In some implementations, the aperture 6 may comprise a mask to encode the intensity or angle of the received light.

At operation 420, one or more pupil optical components converge the light received through the aperture. At operation 430, the converging light enters the OFEC 3, and reflectors of the OFEC 3 are configured to reflect the light to tessellate a size of the one or more pupil optical components or an image sensor of the system. In particular, the OFEC 3 is configured to fold larger angles of the converging light onto one or more sensor optical components 2. Accordingly, whereas the light rays in conventional cameras would simply reflect off of the walls of the lens pipe, in the instant implementation the light rays may reflect off of the mirrors of the OFEC 3 and come back toward the image sensor 11 with different, typically steeper angles.

At operation 440, the one or more sensor optical components 2 is configured to multiplex light received from OFEC 3 to different regions of image sensor 11. Accordingly, the steeper angles of the light rays that are fed from OFEC 3 may be captured by image sensor 11 and then extracted via a computer electrically coupled to the image sensor.

At operation 450, image sensor 11 is configured to convert, to electrical charge, the light received from one or more sensor optical components 2. In this instance, the image sensor 11 captures a multiplexed image.

At operation 460, a computer may process the multiplexed image captured by image sensor 11. In some implementations, processing the multiplexed image comprises: using one or more algorithms to tile back different pieces of the multiplexed image and create a larger image that is captured with the image capture system.

FIG. 3A is a perspective view of the way a tessellation display system 500 is perceived for a near head display implementation where the core display is tessellated to a larger size, in accordance with implementations of the disclosure. As used herein, near head displays may refer to displays that provide virtual depth so that a user's head may be placed near (less than 50 cm) the exit pupil of the system, yet the user may still perceive an image that appears to be further (e.g., greater than 50 cm) away. In such implementations, when the user's head is placed close to the exit pupil, the image appears larger than the pupil size of the system similar to the perception that is obtained when looking through a window. As can be appreciated from the example illustrated in FIG. 3A, by virtue of using OFEC 3 to reflect light from the display that would otherwise be absorbed by the walls of the "pipe," the aforementioned piping problem may be overcome. In this instance, the display 3 functions as a directional display that shows different images at different angles and that are reflected to the viewer through the reflective walls of the OFEC. This same effect may be observed in the case of image capture systems such as FIG. 4A, further described below.

101061 FIG. 3B is a perspective view of the way a tessellation display system 600 is perceived for near eye display tessellation via an OFEC, in accordance with some implementations of the disclosure. In this example, the OFEC is angled and the core display is curved. In near eye display implementations, the pupil optic may be a short focal length Fresnel lens or catadioptric lens.

Figure 3C:
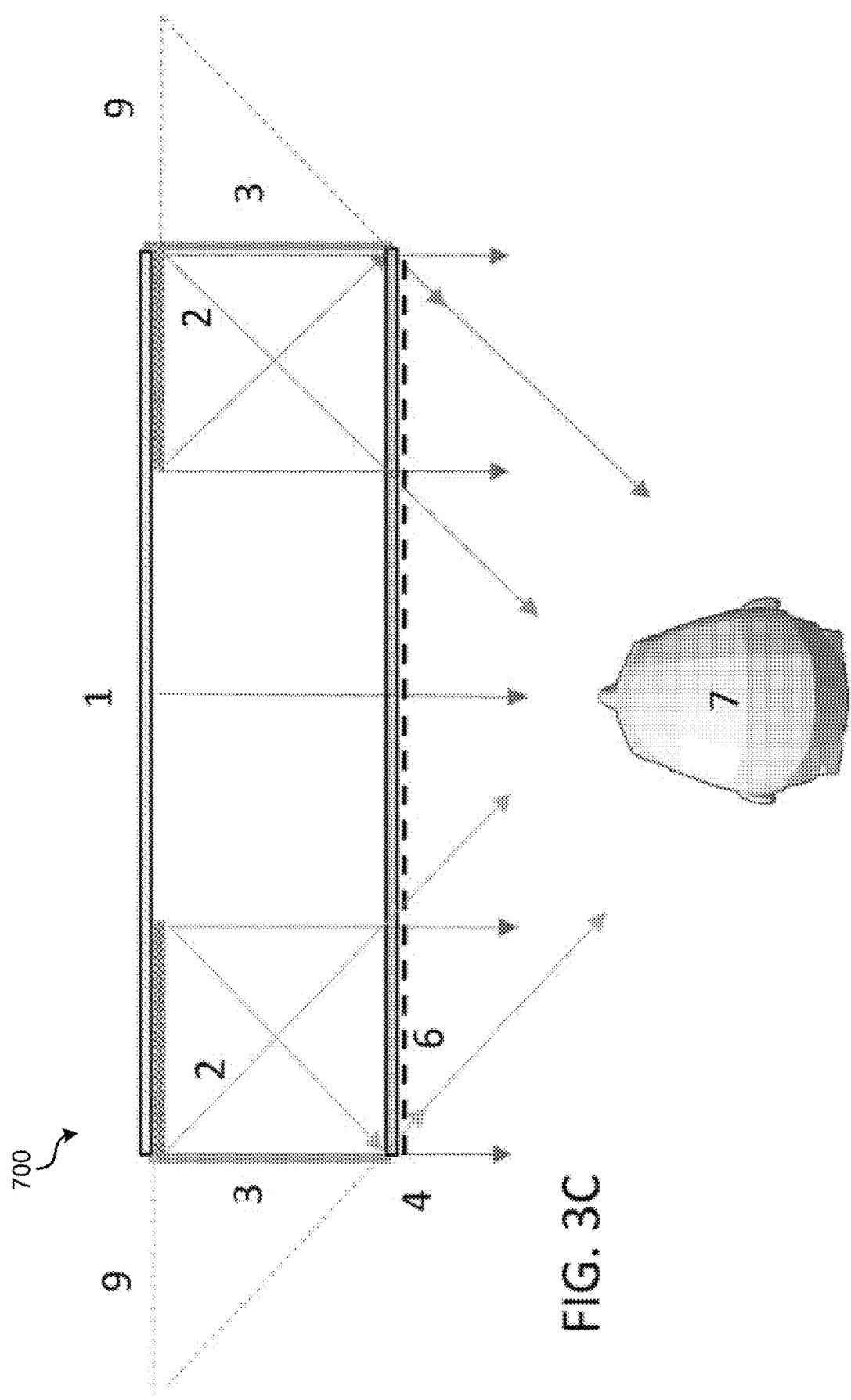
FIG. 3C is a perspective view of the way a tessellation display system is perceived for large scale display tessellation, in accordance with some implementations of the disclosure.

FIG. 3C is a perspective view of the way a tessellation display system 700 is perceived for large scale display tessellation, in accordance with some implementations of the disclosure. For example, system 700 may correspond to a larger monitor or a set of monitors. In this example, partial tessellation is implemented. In other words, tessellation is only implemented on some fraction of a display (e.g., as in case of large monitors to increase the size of the monitor by double or a desired percentage). In such implementations, the preparation optics may cover only a desired portion of the core display.

FIG. 3D-1 is a perspective view and FIG. 3D-2 is a side view of the way a tessellation display system 800 is perceived for near head display tessellation with a curved back visor, in accordance with some implementations of the disclosure. As seen in FIGS. 3D-1 and 3D-2 the pupil optics might be a curved reflective visor in case of near head displays. As also depicted in this example, the tessellation display system 800 includes directional speakers 15 of a sound system. The directional speakers may be positioned near the ear to provide immersive sound. In some implementations, a near head tessellation display system may be attached to a user's adjustable office chair to provide content in a convenient and ergonomic fashion.

Figure 4C:
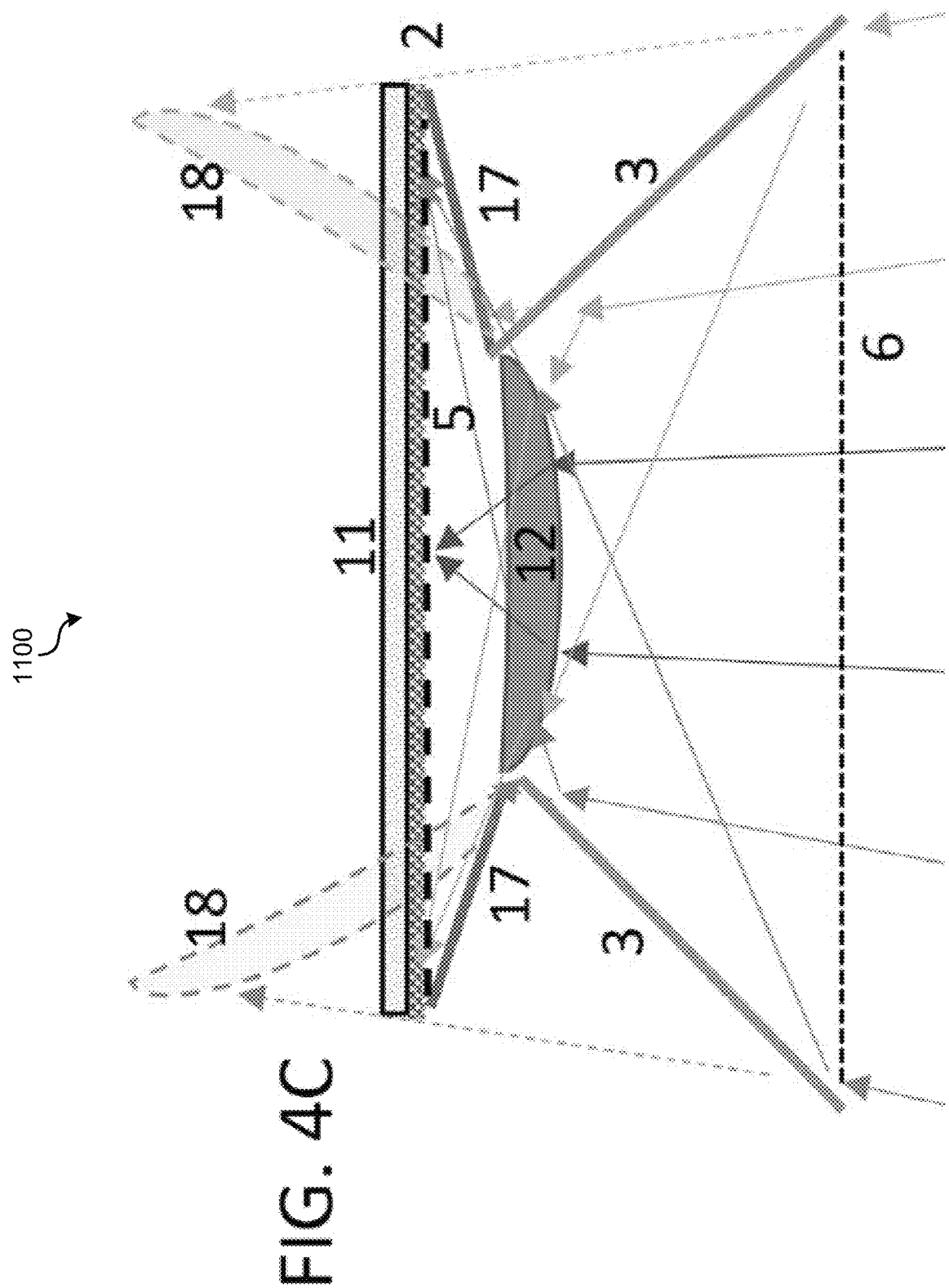
FIG. 4C is a perspective view of a tessellation image capture system where a lens of pupil optics is tessellated to feed a larger image sensor, in accordance with implementations of the disclosure.

FIGS. 4A-4C illustrate various tessellation image capture systems that utilize an OFEC, in accordance with implementations of the disclosure. In these implementations, further described below, the OFEC 3 may be positioned right in front of the lens of the pupil optics, behind the lens of the pupil optics, or in front of the image sensor plane and behind the lens as illustrated in FIG. 4A, FIG. 4B, and FIG. 4C respectively.

FIG. 4A is a perspective view of a tessellation image capture system 900 where the image sensor 11 is at the core plane 5 and is tessellated using an angled OFEC 3, in accordance with implementations of the disclosure. In this example, the OFEC 3 is at the back of the lens of pupil optics 12 and in front of image sensor 11 to optically expand the lens pipe for the image sensor. In this embodiment, light rays that would traditionally hit the walls of the lens pipe and not go to the image sensor are captured. This implementation allows using a smaller image sensor for a larger lens, which may result in better light performance of the system.

FIG. 4B is a perspective view of a tessellation image capture system 1000 where the image sensor 11 and the pupil optics 12 are both tessellated using an extended OFEC 3, in accordance with implementations of the disclosure. As depicted in this example, the steep light rays that would normally pass from the front of the lens are guided into the lens via the extended OFEC 3. The light rays may then be guided to the image sensor 11 with the sensor optics 2. In this example embodiment, the image sensor 11 is tessellated (depicted as tessellated core plane 13) and the lens of pupil optics 12 are tessellated (depicted as tessellated pupil optics 18. Therefore, it appears that the apparatus has a larger aperture and a larger image sensor.

FIG. 4C is a cross sectional view of a tessellation image capturing system 1100 where a lens of pupil optics 12 is tessellated to feed a larger image sensor 11, in accordance with implementations of the disclosure. In particular, a lens 12 is replicated or tessellated optically (illustrated as tessellated pupil optics 18) with the OFEC 3 to enable capturing a larger portion of a scene. As such, this example enables a camera to use a small lens to feed a larger image sensor. In this example, the absorber walls are absorbent sheets that absorb the light and are there to absorb the stray light that may arise from higher orders of the OFEC. The light that is directly in front of the lens passes through and makes an image on the center part of the sensor. The other part of light coming from the scene in front of this image will reflect from the OFEC facets and then pass through the lens and make a tessellated image on the sensor. The sensor may be angle sensitive as noted by preparation optics positioned at the core plane and on the sensor. In such cases, the different tessellation orders may be captured at different angles and the images may be reconstructed later on in the computer.

The illustrated imaging systems of FIGS. 4A-4C may have angled facets or perpendicular facets for their OFEC 3, which would enable capturing a light field of the pupil of the OFEC. In such cases, each order of the cavity may capture slightly different angles of light from the plane in front of the camera and feed the light to the preparation optics.

Figure 5A:
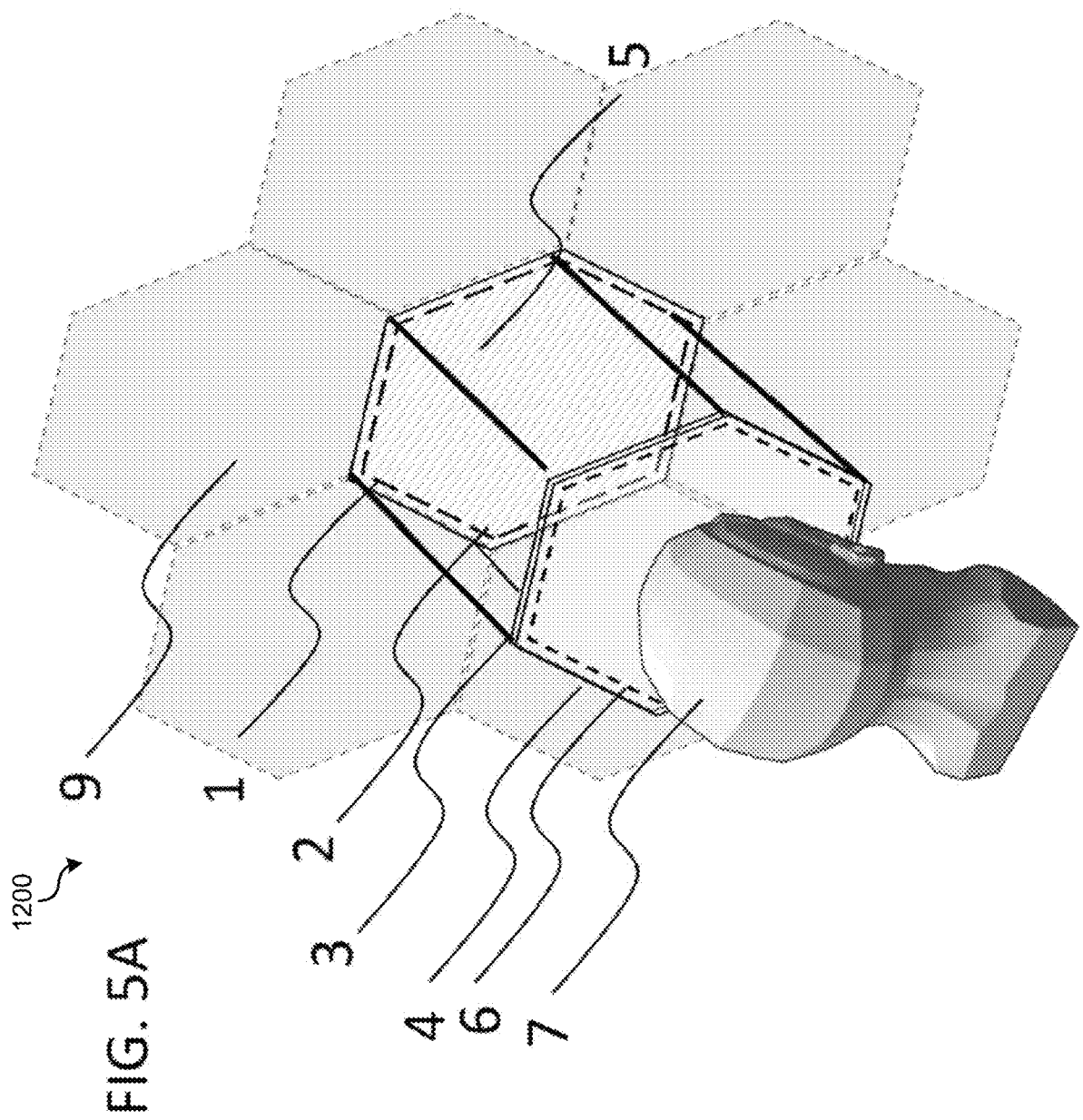
FIG. 5A shows a tessellation display system where the core plane is a hexagon, and the OFEC has a hexagonal cross-section with six facets, in accordance with implementations of the disclosure.

FIGS. 5A-5B illustrate different implementations of an OFEC 3 for a tessellation display system, in accordance with implementations of the disclosure. FIG. 5A shows a tessellation display system 1200 where the core plane 5 is a hexagon, and the OFEC 3 has a hexagonal cross-section with six facets, in accordance with implementations of the disclosure.

FIG. 5B shows a side view of an angled tessellation display system 1300 where the OFEC 3 has a "wedge-type configuration", in accordance with implementations. The wedge-type configuration refers to when the two facets of the OFEC are not parallel to each other. In this instance, the OFEC 3 may be referred to as a wedge-type FEC. In this example, display images are fed through the facets of OFEC 3, which in this case are half-mirrors rather than full mirrors. The preparation optics in FIG. 5B is there to provide an angular profile for the light that is emitted from the emissive display. In this example case, it is a Lenslet array with prismatic film on top. Lenslet array is an array of small lenses that each cover a few set of pixels (e.g., 3×3). Prismatic film is a transparent film that has microstructures on one surface shaped as periodic array of prisms. Prismatic film directs the light from each pixel into a certain desired angle.

It should be noted that the angle of each facet of OFEC 3 relative to the display plane, pupil plane, or sensor plane may impact the range of angles that enters the display/imaging system or exists in the system. This angle may also change the way that the core plane is expanded in three dimensions. In implementations where the angle is a right angle ($\theta=90$) the core plane may be expanded horizontally and vertically, but in the same plane as the core plane. This is illustrated, for example, in FIGS. 1A and 5A. For angles smaller than 90 degrees ($\theta<90$) the core plane may be expanded on a concave surface, meaning that the tessellated planes may bend toward the core plane. For angles greater than 90 degrees ($\theta>90$), the core plane may expand on a convex surface, such that the light is exiting a convex surface (in case of a display). In this case the tessellated planes may bend toward the back of the core plane. As such, in instances of a curved tessellated display, cameras with fish eye lenses where the user desires a curved tessellated display, or a camera with a fish eye lens where the user desires to make the tessellated sensor appear curved to reduce aberration, it may be desirable to use an angled OFEC (whether greater or less than 90 degrees).

In some implementations, the reflective facets or reflectors of OFEC 3 may be configured to be activated or deactivated using polarization. Such examples, are further described below with reference to FIG. 6A, FIG. 6B-1, FIG. 6B-2, FIG. 6C-1, and FIG. 6C-2.

FIG. 6A shows an OFEC 3 comprising a switchable mirror comprising a bottom absorptive polarizer, a middle reflective polarizer, and a top liquid crystal layer. In this implementation, the top liquid crystal layer is configured to change the polarization of the light. Based on the polarization, the light is reflected or absorbed by the lower layers.

FIGS. 6B-1 and 6B-2 conceptually illustrate implementations of electro-optical tessellation where a mirror of a hexagonal cross-sectioned OFEC (the core plane has the shape of a hexagon with mirrors attaching to each side of the hexagon and are positioned to be perpendicular to the plane of the core plane) is sequentially turned ON and OFF, in accordance with implementations of the disclosure.

FIG. 6B-1 shows the case where the switchable mirror is sequentially turned reflective and absorptive to raster or scan the virtual image sequentially so that the angular bandwidth for the middle plane (whether there is a display or sensor) is reduced and multiplexed into the time domain. Another advantage of sequential scanning is that it may reduce the need for the preparation optics 2 to have a very accurate angular profile. For example, in FIG. 6B-1 the middle plane may have a preparation optics layer that emits or senses light only in 3 angles: left-up, right-bottom, and perpendicular angles. In this embodiment, the apparatus goes through seven steps sequentially in time as indicated in FIG. 6B-2. For example, define the horizontal and vertical light ray angle that is coming to the core plane or is emitted out of the core plane as (a, f3) with (a=0, f3=0) as the angle at which the light is emitting or being absorbed (detected or sensed) at a perpendicular angle to the plane. A positive value of these angles indicates that the light is traveling toward the right and/or up directions, and negative a negative value of these angles indicates that the light is traveling in left and/or down directions. Also define a mirror signal matrix with 0 as OFF and 1 as ON; $\mathcal{M}$ =[m1, m2, m3, m4, m5, m6,] In FIG. 6B-2; at t0, (a=0°, f3=0°) and $\mathcal{M}$ =[0,0,0,0,0,0]; at t1, (a=45°, f3=45°) and $\mathcal{M}$ =[1,0,0,0,0,0]; at t2, (a=45°, f3=45°) and $\mathcal{M}$ =[0,1,0,0,0,0]; at t3, (a=45°, f3=45°) and $\mathcal{M}$ =[0,0,1,0,0,0]; at t4, (a=−45°, f3=−45°) and $\mathcal{M}$ =[0,0,0,1,0,0]; at t5, (a=−45°, f3=−45°) and $\mathcal{M}$ =[0,0,0,0,1,0]; at t6, (a=−45°, f3=−45°) and $\mathcal{M}$ =[0,0,0,0,0,1]. This sequence of signals for the mirrors may help the apparatus eliminate the fqw tessellation because there is only one mirror turned ON at a time. This may also help to have only three, rather than six, directions of light rays from the core.

FIGS. 6C-1 and 6C-2 conceptually illustrate implementations of electro-optical tessellation where a mirror of an OFEC having a rectangular cross-section is sequentially turned ON and OFF, in order to eliminate higher order tessellations, in accordance with implementations of the disclosure. FIG. 6C-1 shows the use of switchable mirror to feed each different tessellated images for a rectangular core plane. Similar to the hexagonal case, there is a sequence for the signal to the mirrors to create what is needed. However, the images at the corners need to be created with a combination of mirrors because there are only four mirrors but eight neighboring tessellated images. This may be a disadvantage of rectangular or square shaped core planes, because it indicates that the light from the core should be directional to that specific angle; otherwise, there will be two unwanted replicas which are created by each ON mirror individually. The signal time sequence to raster the neighboring tessellation images which will tessellate the core plane of rectangular shape to 9 times larger than the core plane is given as below (FIG. 6C-2). At t0, (a=0°, f3=0°) and $\mathcal{M}$ =[0,0,0,0]; at t1, (a=−45°, f3=45°) and $\mathcal{M}$ =[1,0,0,1]; at t2, (a=0°, f3=45°) and $\mathcal{M}$ =[1,0,0,0]; at t3, (a=45°, f3=45°) and $\mathcal{M}$ =[1,1,0,0]; at t4, (a=45°, f3=0°) and $\mathcal{M}$ =[0,1,0,0]; at t5, (a=45°, f3=−45°) and $\mathcal{M}$ =[0,1,1,0]; at t6, (a=0°, f3=−45°) and $\mathcal{M}$ =[0,0,1,0]; at t7, (a=−45°, f3=−45°) and $\mathcal{M}$ =[0,0,1,1]; at t8, (a=−45°, f3=0°) and $\mathcal{M}$ =[0,0,0,1]. In these implementations, each fraction of the tessellation is turned on at different time intervals with different content that together then tiles the entire tessellated space. In some implementations, not illustrated in this disclosure, the mirror facets of the OFEC may have curvature to create more complex functionality to the system. One such functionality is 3D profiling of the tessellated virtual plane image.

In some implementations, the pupil optics 4 of the tessellation display systems described herein may be active or configured as a FEC in order to enable depth shifting of the image. FIG. 7A shows a top view of a three-dimensional tessellation display system 1400, having both an OFEC 3 for expanding or tessellating an image's size (e.g., in an x,y plane), and a FEC 4 for changing the image's depth (e.g., in z plane), in accordance with implementations of the disclosure. In this example, three-dimensional tessellation may be implemented by simultaneously tessellating the image depth (z) and image size (x and y).

FIG. 7B illustrates an arrangement of tessellation vector indices where three dimensional tessellation may address or place an image at any position in three-dimensional space, depending on the order of the tessellation and FEC, in accordance with some implementations of the disclosure. FIG. 7C is an exemplary matrix of a three-dimensional tessellation and arrangement of tessellation vector indices where the indices correspond to tessellating the core to 25 times larger than the core, in accordance with some embodiments.

As is apparent from FIGS. 7B-7C, the optical expansion that is provided by the cavity is the result of angle selectivity of the OFEC which assigns different set of round trips to different angles. Each of the round trips tiles into a different angle into the virtual image in front of the user. The first order is shown with ray tracing in FIG. 3A. Light that has a steeper angle coming out of the directional core display will have to reflect more times in the OFEC and thus is seen to be coming from a longer distance at corners of the user's FOV. This is illustrated for one pixel via the arrows shown in FIG. 7B.

In some implementations, the front and back facets (the back facet being the one closer to the core plane and the front facet being the one closer to the users face) of system 1400 may be active and polarization dependent to switch between transparency and reflectivity, or they may be curved to shape the wavefront within the cavity. In order to describe and address each tile of the tessellated space in three dimensions we define a tessellation vector as below (Eq. 1).

$$[\alpha_{T_x,T_z}, \beta_{T_y,T_z}, H_{T_x,T_z}, V_{T_y,T_z}] \mid _{T_x=\text{horizontal tessellation order}} \quad \text{(Eq.1)}$$
$$T_y=\text{vertical tessellation order}$$
$$T_z=\text{order of field evolving cavity}$$

Here the Tx is the order of horizontal tessellation with positive values for tessellation on the right and negative values for tessellation on the left and zero indicating no tessellation. Ty is the order of vertical tessellation with positive values for the tessellation to the top and negative values for the tessellation in the bottom and zero indicating no tessellation. Tz is the order of the FEC in depth; with positive values indicating deeper image and negative values indicating a protruding image; zero indicates the original depth of the core plane. In this case $\alpha_{T_x,T_z}$ indicates the horizontal angle of the light ray emitting or going to the core plane at Tx order of horizontal tessellation and Tz order of the FEC. $\beta_{T_x,T_z}$ indicates the vertical angle of the light ray emitting or going to the core plane at Ty order of vertical tessellation and Tz order of the FE cavity; $H_{T_x,T_z}$ is the horizontal symmetry coefficient and $V_{T_y,T_z}$ is the vertical symmetry coefficient. The +1 value of this coefficient means that the direction of the images matches that of the core image in that axis and −1 value indicates that the image is flipped or mirrored compared to the original orientation of the core image (FIG. 7C).

The values of the tessellation vector for a cubic box like OFEC at a given Tz order of the cavity is expanded as in Eq. 2-5.

$$\alpha_{T_x,T_z} = \frac{T_x}{|T_x|}(-1)^{(T_x+1)}\left(90 - \tan^{-1}\left(\frac{(2T_z+1)l}{w.T_x}\right)\right); \quad \text{(Eq.2)}$$

$$\beta_{T_y,T_z} = \frac{T_y}{|T_y|}(-1)^{(T_y+1)}\left(90 - \tan^{-1}\left(\frac{(2T_z+1)l}{h.T_y}\right)\right); \quad \text{(Eq.3)}$$

$$H_{T_x,T_z} = (-1)^{T_x}; \quad \text{(Eq.4)}$$

$$V_{T_y,T_z} = (-1)^{T_y}; \quad \text{(Eq.5)}$$

The tessellation vector gives full description of how (or in what direction) each content should be displayed at the core plane to make the larger desired image. In these equations for each Tz the tessellation order matrix is given as Eq. 6.

$$[T_z, T_y]\mid_{T_z=cte} \underset{T_x=N}{\overset{}{=}} \begin{bmatrix} -N, M & \cdots & N, M \\ \vdots & 0,0 & \vdots \\ -N, -M & \cdots & N, -M \end{bmatrix}; \quad \text{(Eq.6)}$$
$$T_y=M$$

The extent or area of tessellation space has direct relation with order of the OFEC as formulated.

$$S = A[1+\Sigma_{i=0}^{P}iD] \quad \text{(Eq. 7)}$$

Where P is the order of the OFEC (assuming horizontal and vertical orders are equal M=N=P) and D is number of sides of the core cross section polygon of the OFEC, A is the area of the core plane. For example, for a hexagonal core at sixth order of OFEC the tessellated area is A[1+6+12+18+24+30+36]=127A which is over a hundred times larger than the physical area of the core. The angle that the OFEC may accept light (input light into its core) depends on the preparation optics angular sensitivity or angular profile of the light field at the core plane either in imaging or display plane and it was further elaborated in Eq. 1-6.

While the core plane can be arbitrarily engineered. In some embodiments the core plane may only have few or one sensor or few or one pixel. In some implementations, an array of two or more OFECs may be used to tile a larger light field or larger sensing area. In such implementations, angular directionality may be provided using a two-dimensional (2D) scanning Micro Electromechanical System (MEMS) mirror. This configuration may also be used in reverse as a method to image large areas with extremely small probes or a single pixel, which may be suited for micro-surgery, endoscopy, and microscopy. In such implementations, the MEMS system may have a sensor on it rather than a mirror. Alternatively, it may have a mechanism that may be engineered to feed a sensor at different angles. In some applications, embodiments may be used for 3D scanning of an object or a surface as each point that is in front of the OFEC (in front of the sensor) is viewed by the sensor with multiple angles thus capturing the light field at the front of the apparatus. In some embodiments the sensor might be a time-sensitive or phase sensitive sensor. For example, the sensor at the core plane might be a time-of-flight sensor, it might be an optical coherence tomography sensor (an autocorrelator), it might be an infrared sensor to extract depth from structure.

In some tessellation image capture system implementations, the OFEC might also be combined with an FEC for compressing the optics size or providing depth functionality. FIG. 8 depicts an active tessellation image capture system 1500 (e.g., camera) with both a FEC for providing zooming/depth shift and an OFEC for tessellating the lens of the pupil optics or the image sensor, in accordance with implementations of the disclosure. In this instance, the image sensor 11 may be depth sensitive, time sensitive, or rely on the phase of the light. Where the image sensor 11 has ultrafast or depth sensitivity, the time of arrival of the light may be used instead of the angle-dependent sensor optics. This may enable capturing the light field via time or optical tessellation via time of arrival or depth extracted from the phase of the light. In implementations where the light is coherent, the phase of the light may be used instead of the time or angle to encode different angles, thus allowing the capturing of light field via the phase of the light at each tessellation facet. In some implementations, the sensor 11 might be a hologram where different angles enter the OFEC and record a hologram. Specifically, in case of hexagonal OFEC, the structure might be used to record a six-pack hologram. That includes the interferometric information in all the six directions in which the system compresses six off-axis holograms into a multiplexed off-axis hologram without loss of magnification or resolution. Since the six different complex wavefronts do not overlap in the spatial-frequency domain (the spatial frequency domain is the domain defined by taking Fourier transform of the spatial (x,y) domain), they can be fully reconstructed. Six pack holograms are known to allows more than 50% improvement in the spatial bandwidth consumption when compared to other multiplexing FIG. 9A depicts a tessellation display system 1600 including an array of tessellation displays for providing a stereoscopic display, in accordance with implementations of the disclosure. In implementations where system 1600 is used for near head display or near eye display applications, the overlapped tessellated content may provide parallax for the left eye and right eye, resulting in stereoscopic 3D perception.

Figure 9B:
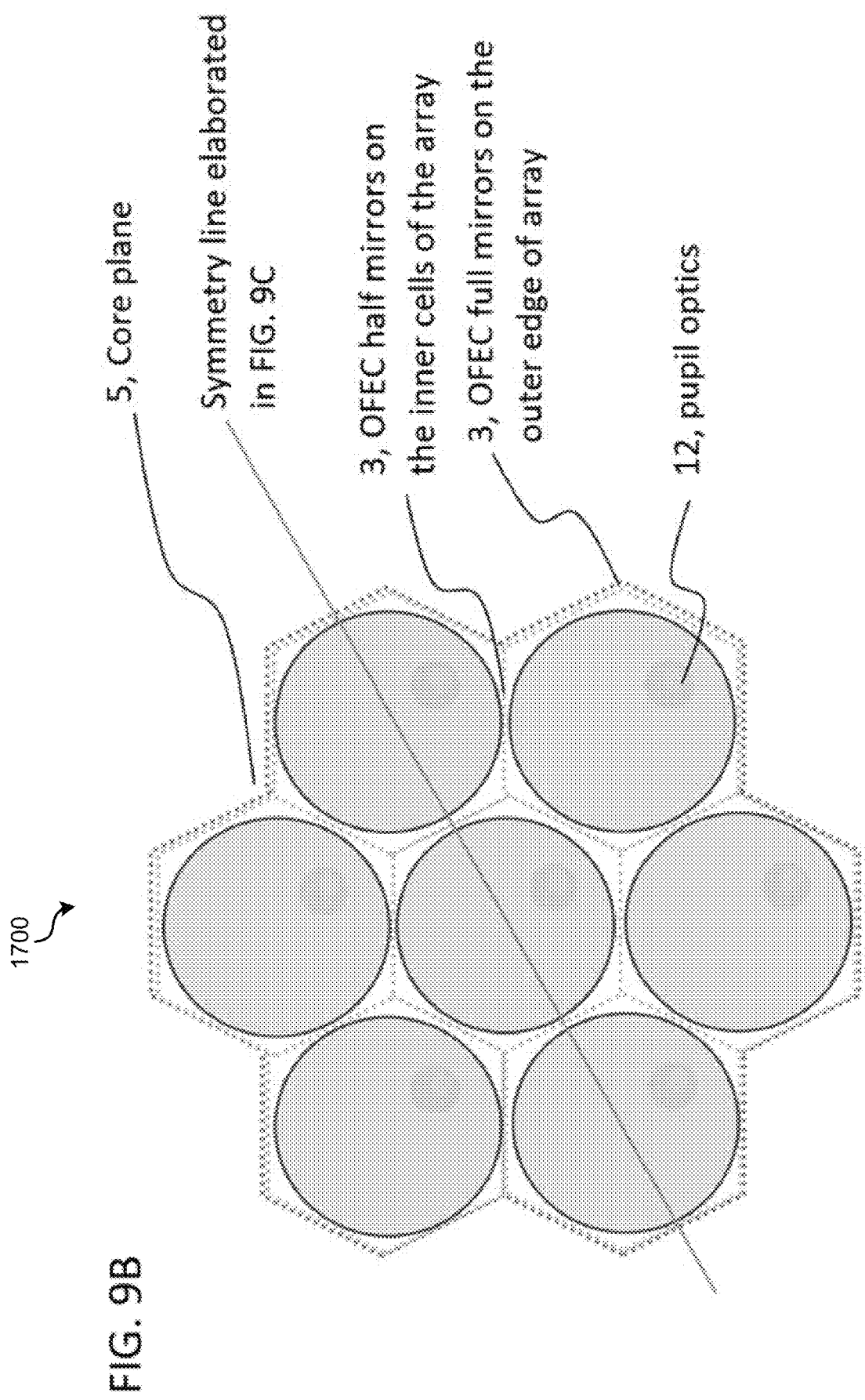
FIG. 9B depicts a tessellation image capture system including a hexagonal array of tessellation cameras, in accordance with implementations of the disclosure.
Figure 9C:
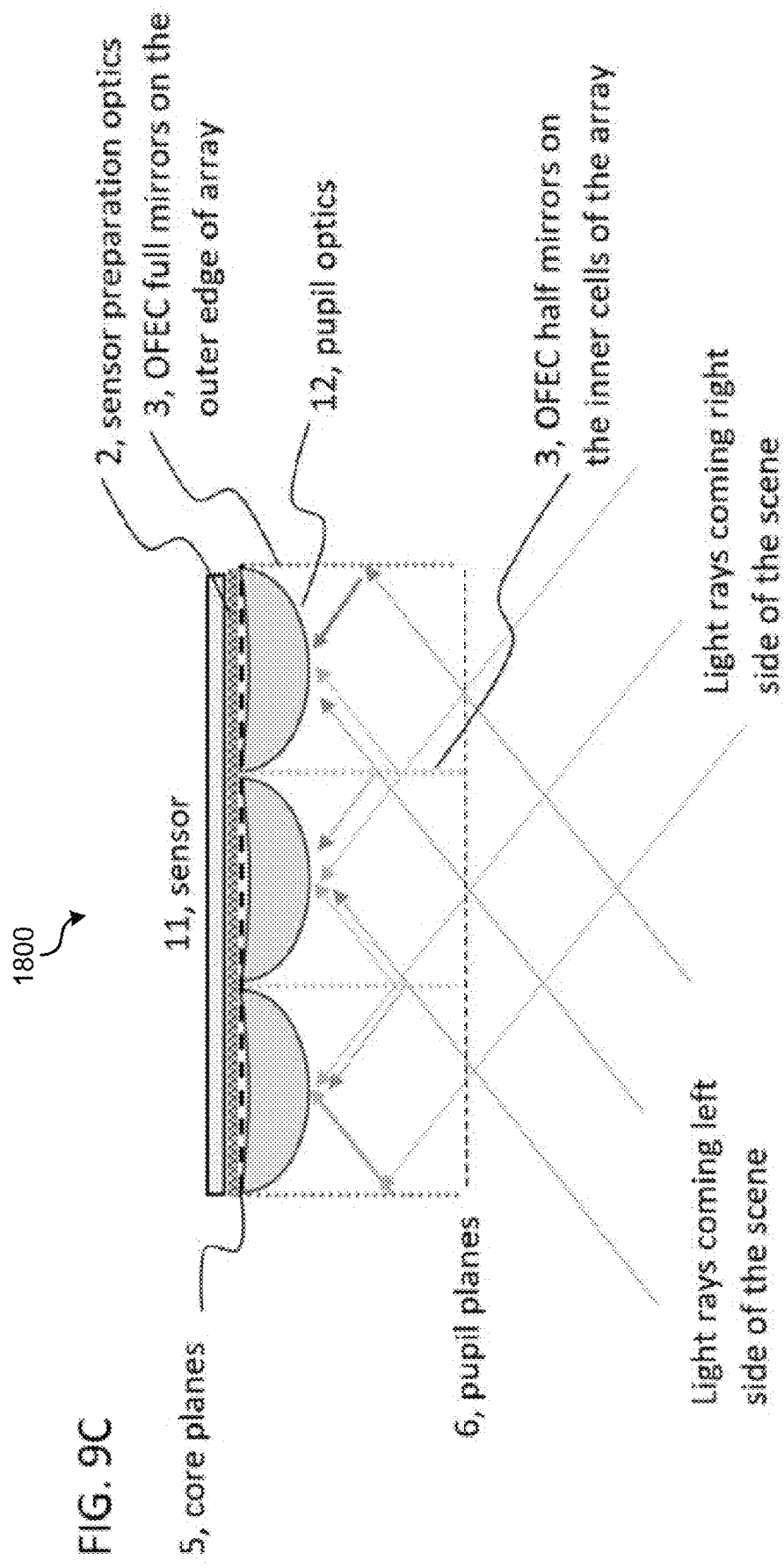
FIG. 9C depicts another tessellation image capture system including an array of tessellation cameras, in accordance with implementations of the disclosure.

FIG. 9B depicts a tessellation image capture system 1700 including a hexagonal array of tessellation cameras. FIG. 9C depicts another tessellation image capture system 1800 including an array of tessellation cameras. The array of tessellation cameras may be utilized to capture a wider field of view, light field, or specialized imaging, in accordance with implementations of the disclosure.

Arraying the OFECs may reduce the demand on optical signal level from a single OFEC such that each OFEC only goes up to one or two orders and not higher. This is helpful since the higher orders of an OFEC requires a greater number of reflection which means that the brightness is reduced and also they require higher angular selectivity for the preparation optics. Arraying OFECs may also allow virtual overlap of the light field. In some implementations (not shown in FIGS. 9A-C) two adjacent OFECs of the array may have different depth for the core plane such that the overlap of the tessellated spaces provides a multiplane light field. Arraying OFECs with sensors for image capture may increase the brightness of the tessellated image as illustrated in FIG. 9B & FIG. 9C, where the image is reinforced by repeating the same image for the adjacent OFEC cells. The repeated images at each cell may be distinguished computationally and used for denoising or noise reduction.

FIG. 10A depicts a tessellation display system 1900 including two wedge-type OFEC that may be implemented in near head displays with stereopsis, in accordance with implementations of the disclosure.

FIG. 10B depicts a tessellation image capture system 2000 including two wedge-type OFEC that may be implemented to form a flat thin camera with a large lens, in accordance with implementations of the disclosure.

FIG. 10A and FIG. 10B show the nonlimiting example embodiments that use wedge-type OFEC to realize circular tessellation of the core plane. This may be applied to reduce the size of the camera lens into an extremely thin formfactor (FIG. 10B). FIG. 10A shows an example of using wedge-type OFEC to create a curved virtual image in front of the eye. Note that in this type of OFEC the facet that is facing the pupil optics is half-mirror and not a full mirror.

The various embodiments described herein may be engineered using a variety of different components. For example, in case of optical or electro-optical tessellation for virtual display expansion, one may use Liquid Crystal Displays (LCD), Thin-film Transistor (TFT), Light Emitting Diode (LED), Organic Light Emitting Diode arrays (OLED), Active Matrix Organic Light Emitting Diode (AMOLED), projection or angular projection arrays on flat screen or angle dependent diffusive screen or any other display technology) and/or mirrors and/or half mirrors and/or switchable mirrors or liquid crystal sheets arranged and assembled in such a way as to exit bundles of light with divergence apex at different depths or one depth from the core plane. The same set of possibilities applies to imaging system sensors and pupil optics. Each block may be an optical system that is functioning in such a way to capture different angles and feed them to the sensor or image plane. For example, in some embodiments the sensor might be a fiber bundle that transfers the image to the sensor; in other embodiments there might be mechanical scanning that allows capturing of different angles. The sensor might be complementary-symmetry metal-oxide-semiconductor (CMOS), Single Photon Avalanche Diode (SPAD) array, Charge Coupled Device (CCD), Intensified Charge Coupled Device (ICCD), Ultrafast Steak sensor, Time-of-Flight sensor (ToF). Schottky diodes or any other light or electromagnetic sensing mechanism for shorter or longer wavelength.

FIG. 11 illustrates a chip set 2200 in which embodiments of the disclosure may be implemented. Chip set 2200 can include, for instance, processor and memory components incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 2200 includes a communication mechanism such as a bus 2202 for passing information among the components of the chip set 2200. A processor 2204 has connectivity to bus 2202 to execute instructions and process information stored in a memory 2206. Processor 2204 includes one or more processing cores with each core configured to perform independently. A multi-core processor enables multiprocessing within a single physical package. Examples of a multi-core processor include two, four, eight, or greater numbers of processing cores. Alternatively or in addition, processor 2204 includes one or more microprocessors configured in tandem via bus 2202 to enable independent execution of instructions, pipelining, and multithreading. Processor 2204 may also be accompanied with one or more specialized components to perform certain processing functions and tasks such as one or more digital signal processors (DSP) 2208, and/or one or more application-specific integrated circuits (ASIC) 2210. DSP 2208 can typically be configured to process real-world signals (e.g., sound) in real time independently of processor 2204. Similarly, ASIC 2210 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 2204 and accompanying components have connectivity to the memory 2206 via bus 2202. Memory 2206 includes both dynamic memory (e.g., RAM) and static memory (e.g., ROM) for storing executable instructions that, when executed by processor 2204, DSP 2208, and/or ASIC 2210, perform the process of example embodiments as described herein. Memory 2206 also stores the data associated with or generated by the execution of the process.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A display system, comprising:
    a physical display configured to emit light corresponding to an image;
    a first optical component positioned in front of the physical display, the first optical component configured to pass the light to an orthogonal field evolving cavity (OFEC) at a plurality of different angles;
    the OFEC, wherein the OFEC is a non-resonant cavity that is orthogonal or angled relative to a plane of the image, and the OFEC comprises a first plurality of reflectors that are configured to reflect the light back and forth within the OFEC to evolve a wavefront associated with the light to tessellate the size of the image such that the image appears to a viewer be coming from a virtual display larger than the physical display; and a second optical component optically coupled to the OFEC, the second optical component configured to relay the image through an exit pupil of the display system to the viewer.

2. The display system of claim 1, wherein the second optical component comprises a second FEC that is a non-resonant cavity that is parallel relative to the plane of the image, the second FEC comprising a second plurality of reflectors configured to reflect the light back and forth within the FEC to change a depth of the image such that the image appears to the viewer be coming from a distance further away than a distance to the physical display.

3. The display system of claim 1, wherein the display system is a near head display system, wherein the second optical component is configured as a curved visor.

4. The display system of claim 1, wherein the OFEC is configured to tessellate only a portion of the image, wherein the first optical component is positioned in front of a portion of the physical display that emits light corresponding to the portion of the image.

5. The display system of claim 4, wherein the OFEC has a rectangular cross-section, wherein the first plurality of reflectors comprise four reflectors.

6. The display system of claim 1, wherein the display system is a near eye display system, wherein the OFEC is angled.

7. The display system of claim 1, wherein the display system is configured to sequentially turn each reflector of the first plurality of reflectors to reflective and absorptive.

8. The display system of claim 1, wherein the OFEC has a hexagonal cross-section, wherein the first plurality of reflectors comprise six reflectors.

9. The display system of claim 1, wherein the OFEC is a wedge-type OFEC, wherein the image that is tessellated is curved.

10. The display system of claim 1, wherein the OFEC is of second order or higher, such that light in the OFEC travels through at least two round trips.

11. The display system of the claim 1, wherein the plurality of reflectors are perpendicular or angled to a plane of the image.

12. The display system of claim 1, wherein the physical display is a first display and the OFEC is a first OFEC, wherein the display system is configured as a stereoscopic display system, the stereoscopic display system comprising:

a left eye display system, comprising: the first display, the first optical component, the first OFEC, and the second optical component; and a right eye display system, comprising:
a second display configured to emit second light corresponding to a second image;
a third optical component positioned in front of the second display, the second optical component configured to pass the second light to a second OFEC at a second plurality of different angles;
the second OFEC, wherein the second OFEC comprises a second plurality of reflectors that are configured to reflect the second light passed at the second plurality of different angles to tessellate the size of the second image to form a second image that is tessellated; and
a fourth optical component optically coupled to the second OFEC, the fourth optical component configured to relay the second image that is tessellated through a second exit pupil to the viewer.

13. The display system of claim 12, wherein the first OFEC and the second OFEC are wedge-type OFECs, wherein the first image and the second image that are tessellated are curved.

14. The display system of claim 1, wherein the display system is a near head display system.

15. The display system of claim 1, wherein the display system is a component of a headset.

16. A method, comprising:
displaying an image at a physical display of a display system;
receiving, at a first optical component positioned in front of the physical display, light corresponding to the image;
passing the light from the first optical component to an orthogonal field evolving cavity (OFEC) at a plurality of different angles, wherein the OFEC is a non-resonant cavity that is orthogonal or angled relative to a plane of the image, and the OFEC comprises a first plurality of reflectors;
reflecting, using the first plurality of reflectors, the light back and forth within the OFEC to evolve a wavefront associated with the light to tessellate the size of the image such that the image appears to a viewer to be coming from a virtual display larger than the physical display; and
relaying, using a second optical component, the image through an exit pupil of the display system to the viewer.

17. The display system of claim 1, further comprising: left and right speakers respectively protruding from left and right sides of the display system, wherein each of the speakers is configured to be placed in proximity to a respective ear of a user of the display system, but not in touching relation to the head of the user, to provide stereo or surround sound.

18. The method of claim 16, wherein:
the second optical component comprises a second FEC that is a non-resonant cavity that is parallel relative to the plane of the image, the second FEC comprising a second plurality of reflectors; and
the method further comprises: reflecting, using the second plurality of reflectors, the light back in forth within the second FEC to change a depth of the image such that the image appears to the viewer to be coming from a distance further away than a distance to the physical display.

19. The method of claim 16, further comprising: sequentially turning, using the display system, each reflector of the first plurality of reflectors to reflective and absorptive.

20. The method of claim 16, wherein the display system is a near head display system.

21. The method of claim 16, wherein the display system is a component of a headset.

* * * * *